US012755665B2

(12) United States Patent
Hwang et al.

(10) Patent No.: US 12,755,665 B2
(45) Date of Patent: Oct. 6, 2026

(54) DISPLAY APPARATUS AND METHOD OF DRIVING DISPLAY PANEL USING THE SAME

(71) Applicant: Samsung Display Co., LTD., Yongin-si (KR)

(72) Inventors: Daeho Hwang, Yongin-si (KR); Taewan Kim, Yongin-si (KR); Hwaan Sung, Yongin-si (KR); Chul Shin, Yongin-si (KR); Jiyoung Eom, Yongin-si (KR); Jeongah Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/011,436

(22) Filed: Jan. 6, 2025

(65) Prior Publication Data

US 2025/0316200 A1 Oct. 9, 2025

(30) Foreign Application Priority Data

Apr. 9, 2024 (KR) ........................ 10-2024-0048329

(51) Int. Cl.
*G09G 3/20* (2006.01)

(52) U.S. Cl.
CPC ... *G09G 3/2003* (2013.01); *G09G 2300/0819* (2013.01); *G09G 2310/08* (2013.01); *G09G 2320/0242* (2013.01)

(58) Field of Classification Search
CPC ... G09G 2320/0257; G09G 2320/0242; G09G 2300/0819
See application file for complete search history.

(56) References Cited

U.S. PATENT DOCUMENTS

2006/0290614 A1* 12/2006 Nathan ................ G09G 3/3233 345/76
2016/0086537 A1* 3/2016 Shin ..................... G09G 3/3225 345/207
2019/0197971 A1* 6/2019 Zha ....................... G09G 3/3406
2020/0152154 A1* 5/2020 Chu ...................... G09G 3/2003
2020/0372859 A1* 11/2020 Kim ...................... G09G 3/3225
2020/0410940 A1* 12/2020 Kim ...................... G09G 3/3275
2022/0148527 A1* 5/2022 Yoshii .................... G06V 10/60
2022/0366843 A1* 11/2022 Noh ...................... G09G 3/3233
2023/0070352 A1* 3/2023 Hwang ................ G09G 3/2007
2024/0221607 A1* 7/2024 Li ......................... G09G 3/3233
(Continued)

FOREIGN PATENT DOCUMENTS

KR 10-2016-0092537 A 8/2016
KR 10-2279373 B1 7/2021
(Continued)

*Primary Examiner* — Bipin Gyawali
(74) *Attorney, Agent, or Firm* — Womble Bond Dickinson (US) LLP

(57) ABSTRACT

A display apparatus includes a display panel, a data driver configured to output a data voltage to the display panel, and a driving controller configured to control the data driver, to determine a compensation target image, to determine a compensation area based on the compensation target image, and to compensate input image data such that a compensation degree of a boundary portion of the compensation area is greater than a compensation degree of a central portion of the compensation area.

17 Claims, 17 Drawing Sheets

(56) References Cited

U.S. PATENT DOCUMENTS

| | | | | |
|---|---|---|---|---|
| 2024/0257689 A1* | 8/2024 | Jung | .................... | G09G 3/2007 |
| 2024/0284771 A1* | 8/2024 | Xu | ........................ | H10K 59/131 |
| 2024/0357865 A1* | 10/2024 | Mou | .................... | G09G 3/3233 |
| 2025/0273112 A1* | 8/2025 | Kim | ..................... | G09G 3/2007 |

FOREIGN PATENT DOCUMENTS

| | | |
|---|---|---|
| KR | 10-2022-0091854 A | 7/2022 |
| KR | 10-2516371 B1 | 4/2023 |

* cited by examiner

DISPLAY APPARATUS AND METHOD OF DRIVING DISPLAY PANEL USING THE SAME

CROSS-REFERENCE TO RELATED APPLICATION

The present application claims priority to, and the benefit of, Korean Patent Application No. 10-2024-0048329, filed on Apr. 9, 2024, in the Korean Intellectual Property Office, the disclosure of which is incorporated herein by reference.

BACKGROUND

1. Field

Embodiments of the present disclosure relate to a display apparatus and a method of driving a display panel using the display apparatus.

2. Description of the Related Art

Generally, a display apparatus includes a display panel and a display panel driver. The display panel displays an image based on input image data. The display panel includes a plurality of gate lines, a plurality of data lines and a plurality of pixels. The display panel driver includes a gate driver, a data driver, and a driving controller. The gate driver outputs gate signals to the gate lines. The data driver outputs data voltages to the data lines. The driving controller controls an operation of the gate driver and an operation of the data driver.

In the display apparatus, a static image, such as a logo, a banner, etc., may partially generate an afterimage, and the afterimage may deteriorate a display quality of the display panel.

To reduce or prevent the afterimage, the driving controller may decrease a luminance of a display image for a portion corresponding to the state image. However, in a conventional method, the afterimage may be still visible at a boundary of the static image.

SUMMARY

Embodiments of the present disclosure relate to a display apparatus for reducing or preventing an afterimage due to a deterioration by relatively strongly compensating a boundary portion of a compensation area, and by relatively weakly compensating a central portion of the compensation area.

Embodiments of the present disclosure also provide a method of driving a display panel using the display apparatus.

In one or more embodiments of a display apparatus according to the present disclosure, the display apparatus includes a display panel, a data driver configured to output a data voltage to the display panel, and a driving controller configured to control the data driver, to determine a compensation target image, to determine a compensation area based on the compensation target image, and to compensate input image data such that a compensation degree of a boundary portion of the compensation area is greater than a compensation degree of a central portion of the compensation area.

A scale factor of the boundary portion of the compensation area may be less than a scale factor of the central portion of the compensation area.

A red scale factor of red data corresponding to the compensation area, a green scale factor of green data corresponding to the compensation area, and a blue scale factor of blue data corresponding to the compensation area may be different from one another.

The red scale factor of the red data corresponding to the compensation area may be less than the green scale factor of the green data corresponding to the compensation area, wherein the blue scale factor of the blue data corresponding to the compensation area is less than the red scale factor of the red data corresponding to the compensation area.

The driving controller may be further configured to determine a first pixel group and a second pixel group, and to determine a compensation cycle and a number of compensation operations.

The compensation cycle may be four frames, wherein the number of the compensation operations is two, wherein a scale factor for first color data in the first pixel group is a first scale factor of one in an N-th frame and an N+1-th frame, and is a second scale factor that is less than one in an N+2-th frame and an N+3-th frame, and wherein a scale factor for first color data in the second pixel group is the second scale factor in the N-th frame and the N+1-th frame, and is the first scale factor in the N+2-th frame and the N+3-th frame.

The compensation cycle may be two frames, wherein the number of the compensation operations is two, wherein a scale factor for first color data in the first pixel group is a first scale factor of one in an N-th frame and an N+2-th frame, and is a second scale factor that is less than one in an N+1-th frame and an N+3-th frame, and wherein a scale factor for first color data in the second pixel group is the second scale factor in the N-th frame and the N+2-th frame, and is the first scale factor in the N+1-th frame and the N+3-th frame.

The compensation cycle may be three frames, wherein the number of the compensation operations is three, wherein a scale factor for first color data in the first pixel group is a first scale factor of one in an N-th frame and an N+3-th frame, is a second scale factor that is less than one in an N+1-th frame and an N+4-th frame, and is a third scale factor that is less than the second scale factor in an N+2-th frame and an N+5-th frame, and wherein a scale factor for first color data in the second pixel group is the third scale factor in the N-th frame and the N+3-th frame, is the second scale factor in the N+1-th frame and the N+4-th frame, and is the first scale factor in the N+2-th frame and the N+5-th frame.

The compensation area may be between a first rectangle, and a second rectangle in the first rectangle.

The compensation area between the first rectangle and the second rectangle may include a first vertical division area defined by a portion of a first horizontal side of the first rectangle, a portion of a second horizontal side of the first rectangle, a first vertical side of the first rectangle, and an extended line of a first vertical side of the second rectangle, a second vertical division area defined by another portion of the first horizontal side of the first rectangle, a first horizontal side of the second rectangle, a portion of the extended line of the first vertical side of the second rectangle, and a portion of an extended line of a second vertical side of the second rectangle, a third vertical division area defined by a second horizontal side of the second rectangle, another portion of the second horizontal side of the first rectangle, yet another portion of the extended line of the first vertical side of the second rectangle, and another portion of the extended line of the second vertical side of the second rectangle, and a fourth vertical division area defined by yet another portion of the first horizontal side of the first rectangle, yet another portion of the second horizontal side of the first rectangle, the extended line of the second vertical side of the second rectangle, and a second vertical side of the first rectangle, wherein the driving controller is configured to decrease a scale factor from a vertical direction central portion to vertical direction boundary portions in the first vertical division area, wherein the driving controller is configured to decrease a scale factor from a vertical direction central portion to vertical direction boundary portions in the second vertical division area, wherein the driving controller is configured to decrease a scale factor from a vertical direction central portion to vertical direction boundary portions in the third vertical division area, and wherein the driving controller is configured to decrease a scale factor from a vertical direction central portion to vertical direction boundary portions in the fourth vertical division area.

The compensation area between the first rectangle and the second rectangle may include a first horizontal division area defined by a first horizontal side of the first rectangle, an extended line of a first horizontal side of the second rectangle, a portion of a first vertical side of the first rectangle, and a portion of a second vertical side of the first rectangle, a second horizontal division area defined by a portion of the extended line of the first horizontal side of the second rectangle, a portion of an extended line of a second horizontal side of the second rectangle, another portion of the first vertical side of the first rectangle, and a first vertical side of the second rectangle, a third horizontal division area defined by another portion of the extended line of the first horizontal side of the second rectangle, another portion of the extended line of the second horizontal side of the second rectangle, a second vertical side of the second rectangle, and another portion of the second vertical side of the first rectangle, and a fourth horizontal division area defined by the extended line of the second horizontal side of the second rectangle, a second horizontal side of the first rectangle, yet another portion of the first vertical side of the first rectangle, and yet another portion of the second vertical side of the first rectangle, wherein the driving controller is configured to decrease a scale factor from a horizontal direction central portion to horizontal direction boundary portions in the first horizontal division area, wherein the driving controller is configured to decrease a scale factor from a horizontal direction central portion to horizontal direction boundary portions in the second horizontal division area, wherein the driving controller is configured to decrease a scale factor from a horizontal direction central portion to horizontal direction boundary portions in the third horizontal division area, and wherein the driving controller is configured to decrease a scale factor from a horizontal direction central portion to horizontal direction boundary portions in the fourth horizontal division area.

The compensation area between the first rectangle and the second rectangle may be divided into a plurality of vertical division area along an extended line of a first vertical side of the second rectangle, and an extended line of a second vertical side of the second rectangle, wherein the compensation area between the first rectangle and the second rectangle is divided into a plurality of horizontal division area along an extended line of a first horizontal side of the second rectangle, and an extended line of a second horizontal side of the second rectangle, wherein a vertical scale factor of a vertical direction is determined in the vertical division area, wherein a horizontal scale factor of a horizontal direction is determined in the horizontal division area, and wherein a final scale factor of a position in the compensation area is determined by multiplying the vertical scale factor and the horizontal scale factor.

The compensation area may be inside of a rectangle representing a static pattern, wherein a vertical scale factor decreases from a vertical direction central portion to vertical direction boundary portions in the rectangle, and wherein a horizontal scale factor decreases from a horizontal direction central portion to horizontal direction boundary portions in the rectangle.

A final scale factor of a position in the compensation area may be determined by multiplying the vertical scale factor and the horizontal scale factor.

The driving controller may include a compensation-area determiner configured to determine the compensation area corresponding to the compensation target image, a compensation-cycle determiner configured to determine a compensation cycle, a compensation-operation determiner configured to determine a number of compensation operations, and a scale-factor determiner configured to determine a scale factor for decreasing a luminance of the compensation target image.

The driving controller may further include an image analyzer configured to determine an image pattern by analyzing the input image data, and an entry-condition determiner configured to determine whether the image pattern continues for a threshold time or longer.

The compensation-area determiner, the compensation-cycle determiner, the compensation-operation determiner, and the scale-factor determiner may be configured to operate in response to an enable signal of the entry-condition determiner.

In one or more embodiments of a method of driving a display panel according to the present disclosure, the method includes determining a compensation target image from input image data, determining a compensation area based on the compensation target image, compensating the input image data such that a compensation degree of a boundary portion of the compensation area is greater than a compensation degree of a central portion of the compensation area, and outputting a data voltage to the display panel based on the input image data which are compensated.

A scale factor of the boundary portion of the compensation area may be less than a scale factor of the central portion of the compensation area.

The method may further include determining a first pixel group and a second pixel group in the compensation area, and determining a compensation cycle and a number of compensation operations.

In one or more embodiments of an electronic device according to the present disclosure, the electronic device includes display apparatus including a display panel, a data driver configured to output a data voltage to the display panel, and a driving controller configured to control the data driver, to determine a compensation target image, to determine a compensation area based on the compensation target image, and to compensate input image data such that a compensation degree of a boundary portion of the compensation area is greater than a compensation degree of a central portion of the compensation area.

The electronic device may include a smartphone, a television, a monitor, a tablet, an electric vehicle, a mobile phone, a tablet personal computer (PC), a mobile communication terminal, an electronic notebook, an electronic book, a portable multimedia player (PMP), a navigation device, an ultra-mobile PC (UMPC), a laptop computer, a billboard, an Internet of Things (IoT) device, a smartwatch, a watch phone, or a head-mounted display (HMD).

According to the display apparatus and the method of driving the display panel, the compensation target image may be determined, the compensation area may be determined, the boundary portion of the compensation area may be strongly compensated, and the central portion of the compensation area may be relatively weakly compensated, so that the afterimage of the boundary portion of the compensation target image may be effectively reduced or prevented.

Different compensation factors may be applied for the red data, the green data, and the blue data, different compensation factors may be applied to the odd-numbered pixel rows and the even-numbered pixel rows in according to frames, the compensation cycle of the compensation area and the number of the compensation operations of the compensation area may be determined so that the afterimage of the compensation target image may be effectively reduced or prevented.

The afterimage of the compensation target image may be reduced or prevented so that the display quality of the display panel may be enhanced.

BRIEF DESCRIPTION OF THE DRAWINGS

The above and other aspects of the present disclosure will become more apparent by describing in detailed embodiments thereof with reference to the accompanying drawings, in which.

DETAILED DESCRIPTION

Figure 1:
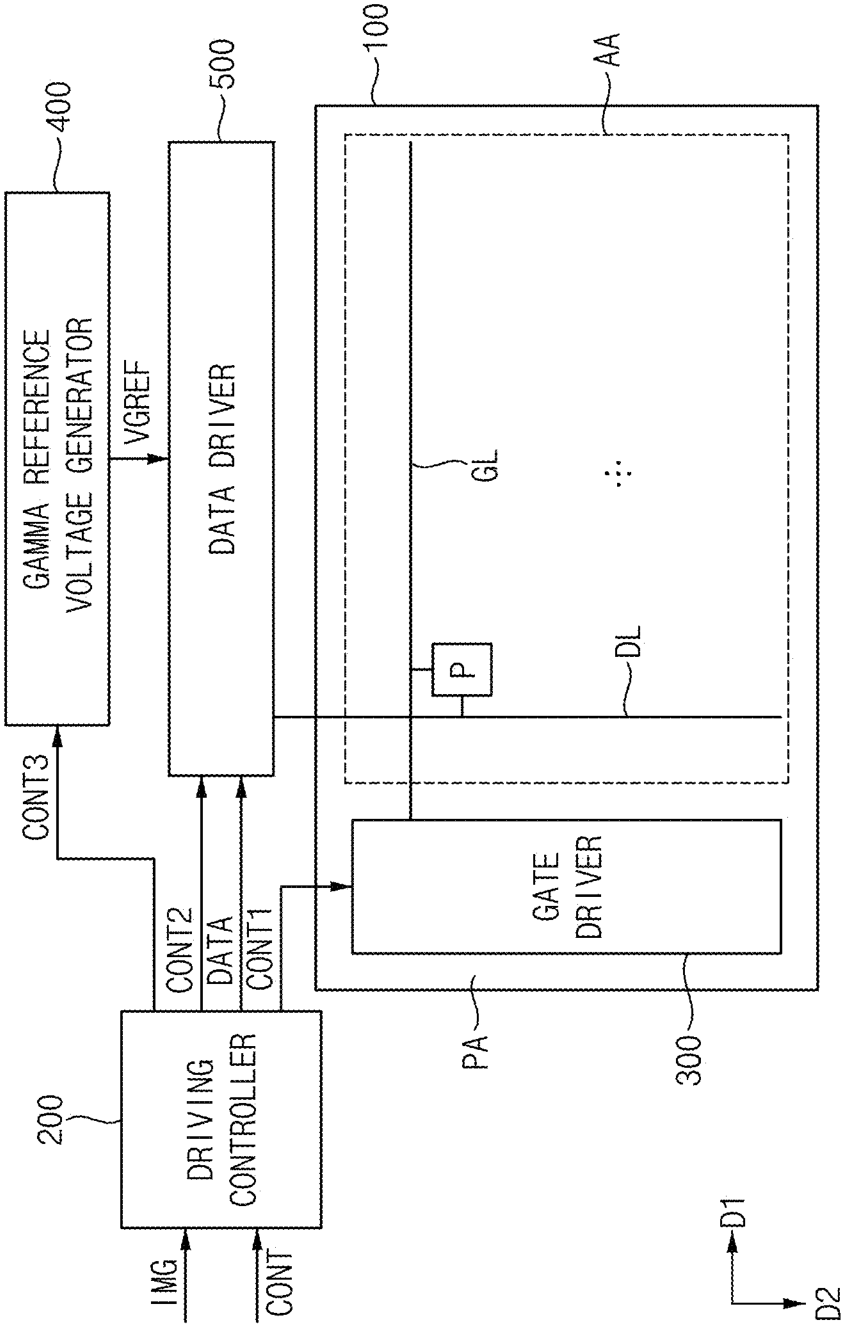
FIG. 1 is a block diagram illustrating a display apparatus according to one or more embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

In the drawings, the relative sizes of elements, layers, and regions may be exaggerated for clarity and/or descriptive purposes. In other words, because the sizes and thicknesses of elements in the drawings are arbitrarily illustrated for convenience of description, the disclosure is not limited thereto.

It will be understood that when an element, layer, region, or component (e.g., an apparatus, a device, a circuit, a wire, an electrode, a terminal, a conductive film, etc.) is referred to as being "formed on," "on," "connected to," or "(operatively, functionally, or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a transistor, a resistor, an inductor, a capacitor, a diode and/or the like. Accordingly, a connection is not limited to the connections illustrated in the drawings or the detailed description and may also include other types of connections. In describing embodiments, an expression of connection indicates electrical connection unless explicitly described to be direct connection, and "directly connected/directly coupled," or "directly on," refers to one component directly connecting or coupling another component, or being on another component, without an intermediate component.

Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." Furthermore, the expression "being the same" may mean "being substantially the same." In other words, the expression "being the same"

may include a range that can be tolerated by those of ordinary skill in the art. The other expressions may also be expressions from which "substantially" has been omitted.

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating a display apparatus according to one or more embodiments of the present disclosure.

Referring to FIG. 1, the display apparatus includes a display panel 100 and a display panel driver. The display panel driver drives the display panel 100. The display panel driver includes a driving controller 200, a gate driver 300, a gamma reference voltage generator 400 and a data driver 500.

For example, the driving controller 200 and the data driver 500 may be integrally formed. For example, the driving controller 200, the gamma reference voltage generator 400 and the data driver 500 may be integrally formed. A driving module including at least the driving controller 200 and the data driver 500 which are integrally formed may be called to a timing controller embedded data driver (TED).

The display panel 100 has a display region AA on which an image is displayed, and a peripheral region PA adjacent to the display region AA.

The display panel 100 includes a plurality of gate lines GL, a plurality of data lines DL, and a plurality of pixels P connected to the gate lines GL and the data lines DL. The gate lines GL may extend in a first direction D1, and the data lines DL may extend in a second direction D2 crossing the first direction D1.

The driving controller 200 may receive input image data IMG and an input control signal CONT from an external apparatus (e.g., an application processor). For example, the input image data IMG may include red image data, green image data, and blue image data. For example, the input image data IMG may include white image data. For example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, a third control signal CONT3, and a data signal DATA based on the input image data IMG and the input control signal CONT.

The driving controller 200 may generate the first control signal CONT1 for controlling an operation of the gate driver 300 based on the input control signal CONT, and may output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and may output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and may output the third control signal CONT3 to the gamma reference voltage generator 400.

The gate driver 300 may generate gate signals driving the gate lines GL in response to the first control signal CONT1 received from the driving controller 200. The gate driver 300 may output the gate signals to the gate lines GL. For example, the gate driver 300 may sequentially output the gate signals to the gate lines GL. For example, the gate driver 300 may be mounted on the peripheral region PA of the display panel 100. For example, the gate driver 300 may be integrated on the peripheral region PA of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500.

In one or more embodiments, the gamma reference voltage generator 400 may be located in the driving controller 200, or in the data driver 500.

The data driver 500 may receive the second control signal CONT2 and the data signal DATA from the driving controller 200, and may receive the gamma reference voltages VGREF from the gamma reference voltage generator 400. The data driver 500 may convert the data signal DATA into data voltages having an analog type using the gamma reference voltages VGREF. The data driver 500 may output the data voltages to the data lines DL.

Figure 2:
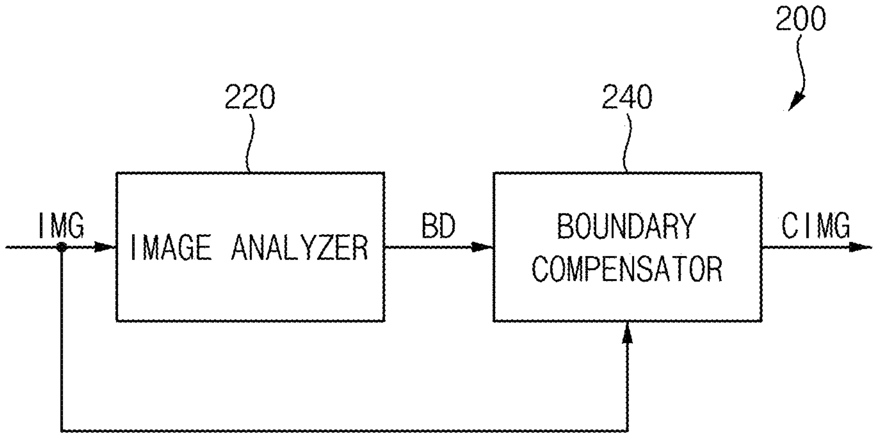
FIG. 2 is a block diagram illustrating a driving controller of FIG. 1.
Figure 3:
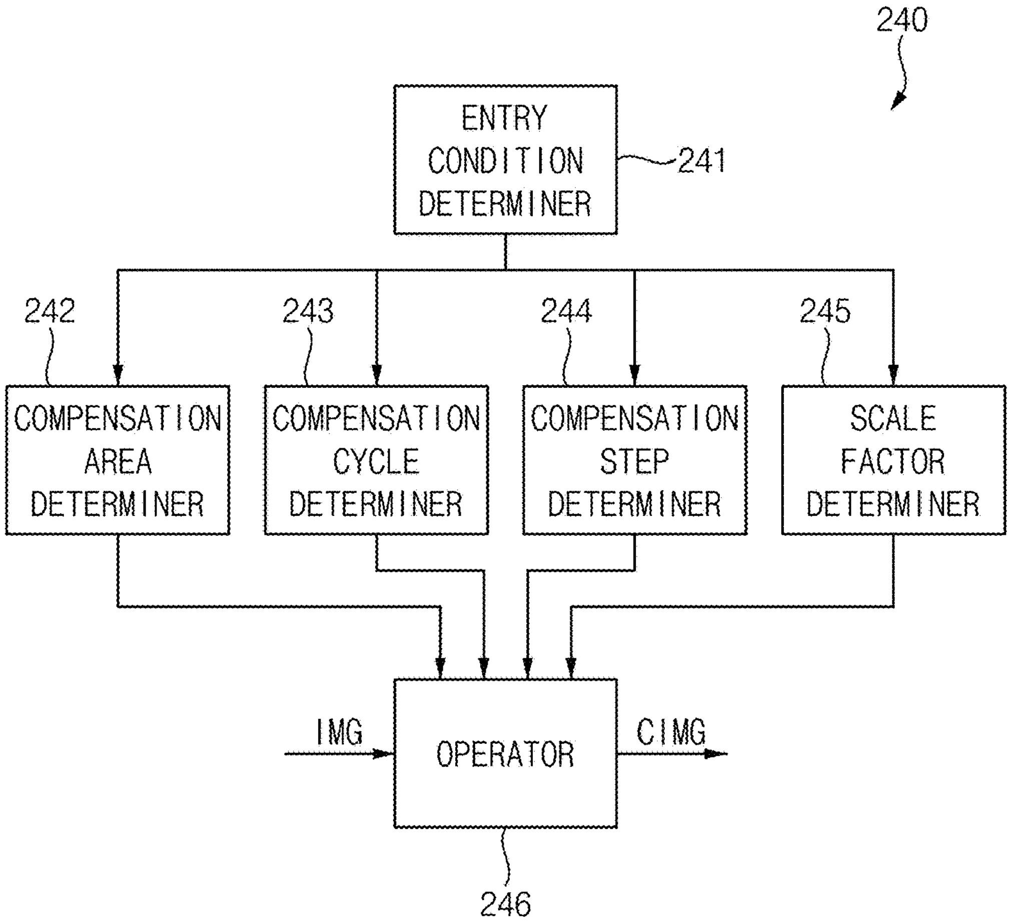
FIG. 3 is a block diagram illustrating a boundary compensator of FIG. 2.

FIG. 2 is a block diagram illustrating the driving controller 200 of FIG. 1. FIG. 3 is a block diagram illustrating a boundary compensator 240 of FIG. 2.

Referring to FIGS. 1 to 3, the driving controller 200 determines a compensation target image, determines a compensation area based on the compensation target image, and compensates the input image data IMG such that a compensation degree of a boundary portion of the compensation area is greater than a compensation degree of a central portion of the compensation area.

The driving controller 200 includes an image analyzer 220 and a boundary compensator 240.

The image analyzer 220 may determine an image pattern by analyzing the input image data IMG. The image analyzer 220 may output a boundary information BD of the image pattern to the boundary compensator 240. The image pattern may include a logo or a banner.

The boundary compensator 240 may receive the input image data IMG and the boundary information BD, and may generate compensation image data CIMG by compensating the input image data IMG. The driving controller 200 may generate the data signal DATA based on the compensation image data CIMG, and may output the data signal DATA to the data driver 500. The data driver 500 may output the data voltage to the display panel 100 based on the compensation image data CIMG.

The boundary compensator 240 may include an entry-condition determiner 241, a compensation-area determiner 242, a compensation-cycle determiner 243, a compensation-operation determiner (e.g., compensation-step determiner) 244, a scale-factor determiner 245, and an operator 246.

The entry-condition determiner 241 may determine whether the image pattern continues for a threshold time (e.g., predetermined threshold time) or longer. When the image pattern continues for the threshold time or longer, the driving controller 200 may determine the image pattern as the compensation target image.

For example, the compensation-area determiner 242, the compensation-cycle determiner 243, the compensation-operation determiner 244, and the scale-factor determiner 245 may operate in response to an enable signal of the entry-condition determiner 241.

The compensation-area determiner 242 may determine the compensation area corresponding to the compensation target image. A compensation degree may be determined according to a position in the compensation area.

The compensation-cycle determiner 243 may determine a compensation cycle. When the compensation cycle is set too long, a luminance decrease may be recognized by a user. When the compensation cycle is set too short, a compensation effect may be too low. The compensation-cycle determiner 243 may determine the compensation cycle according to the display image and conditions of the display panel 100.

The compensation-operation determiner 244 may determine a number of compensation operations. For example, when the number of compensation operations is two, the compensation area may be compensated using a first scale factor of one (e.g., no compensation) and a second scale factor that is less than one (e.g., for operating a compensation). For example, when the number of compensation operations is three, the compensation area may be compensated using a first scale factor of one (e.g., no compensation), a second scale factor that is less than one (e.g., for operating a weak compensation), and a third scale factor that is less than the second scale factor (e.g., for operating a strong compensation).

The scale-factor determiner 245 may determine the scale factor for decreasing a luminance of the compensation target image. For example, the scale factor may be multiplied by a grayscale value of the input image data IMG to decrease the luminance of the compensation target image. Alternatively, the scale factor may be multiplied by a luminance of the input image data IMG to decrease the luminance of the compensation target image.

The scale factor may have a value between zero and one. When the scale factor is one, it may mean no compensation. As the scale factor decreases, a degree of compensation may increase.

The compensation degree of the boundary portion of the compensation area may be greater than the compensation degree of the central portion of the compensation area. Thus, the scale factor of the boundary portion of the compensation area may be less than the scale factor of the central portion of the compensation area.

The operator 246 may generate the compensation image data CIMG by multiplying the grayscale value or the luminance of the input image data IMG by the scale factor.

Figure 4:
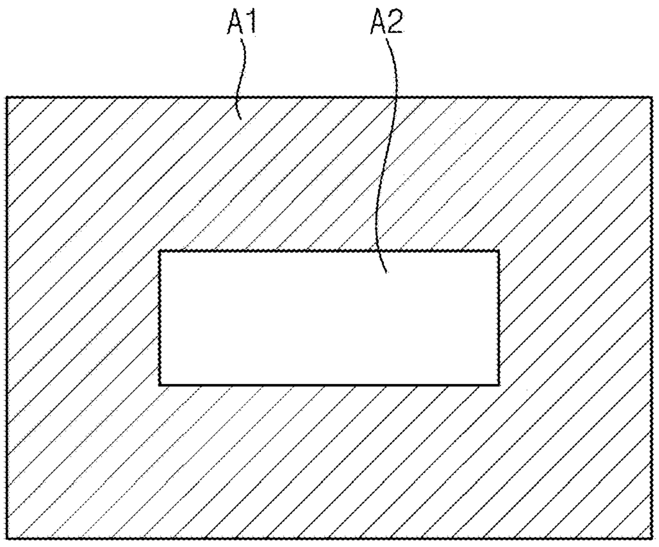
FIG. 4 is a diagram illustrating one or more embodiments of a compensation target image of a display panel of FIG. 1.

FIG. 4 is a diagram illustrating one or more embodiments of the compensation target image of the display panel 100 of FIG. 1.

Referring to FIGS. 1 to 4, the compensation target image may include a first polygon, and a second polygon located in the first polygon. For example, the first polygon and the second polygon may be rectangular.

For example, when the compensation target image is a banner in which text slides or changes within an outer box, the outer box may be the first polygon, and an area where the text slides or changes may be the second polygon.

In this case, the compensation area may be an area between a first rectangle A1, and a second rectangle A2 located in the first rectangle A1. An inside of the second rectangle A2 corresponding to the area where the text slides or changes may not be the compensation area.

Figure 5:
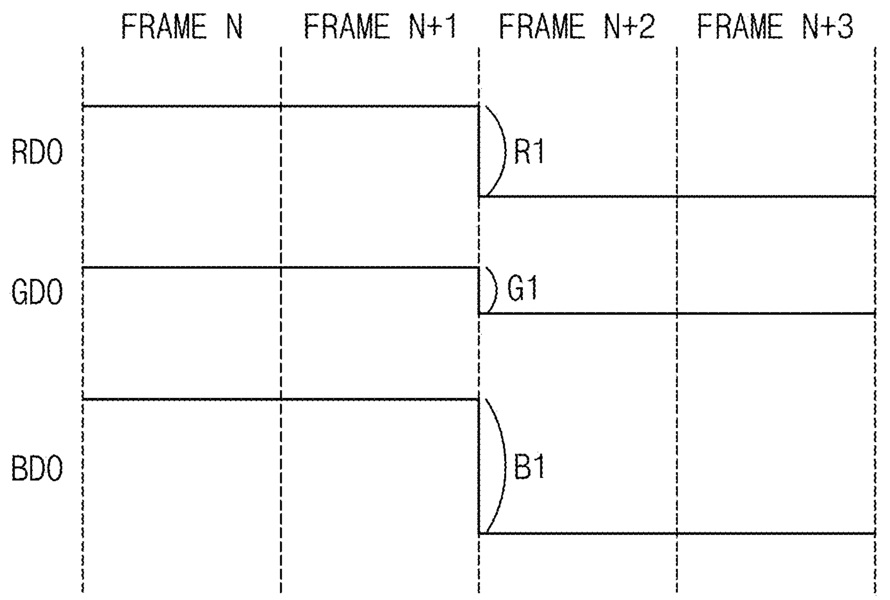
FIG. 5 is a timing diagram illustrating one or more embodiments of a compensation cycle and one or more embodiments of a compensation degree determined by the driving controller of FIG. 2 for a first pixel group.
Figure 6:
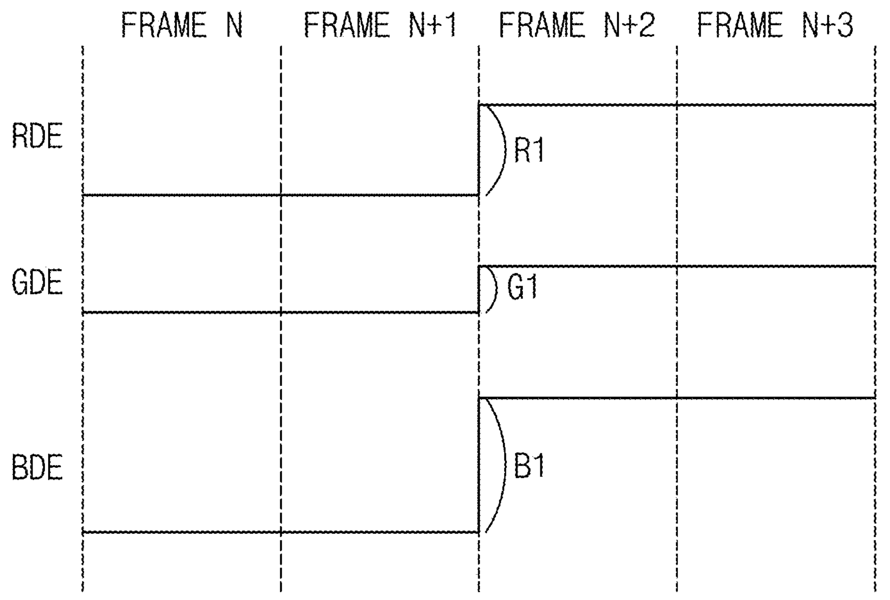
FIG. 6 is a timing diagram illustrating the compensation cycle and the compensation degree determined by the driving controller of FIG. 2 for a second pixel group.

FIG. 5 is a timing diagram illustrating the compensation cycle and the compensation degree determined by the driving controller 200 of FIG. 2 for a first pixel group. FIG. 6 is a timing diagram illustrating the compensation cycle and the compensation degree determined by the driving controller 200 of FIG. 2 for a second pixel group.

Referring to FIGS. 1 to 6, the driving controller 200 may determine the first pixel group and the second pixel group, and may determine the compensation cycle and the number of the compensation operations.

For example, the first pixel group may represent an odd-numbered pixel row, and the second pixel group may represent an even-numbered pixel row. However, the first pixel group and the second pixel group may not be limited to the odd-numbered pixel row and the even-numbered pixel row in the present disclosure.

In addition, a compensation degree R1 of red data corresponding to the compensation area, a compensation degree G1 of green data corresponding to the compensation area, and a compensation degree B1 of blue data corresponding to the compensation area may be different from one another. For example, a red scale factor of the red data corresponding to the compensation area, a green scale factor of the green data corresponding to the compensation area, and a blue scale factor of the blue data corresponding to the compensation area may be different from one another.

As shown in FIGS. 5 and 6, the compensation degree R1 of the red data corresponding to the compensation area may be greater than the compensation degree G1 of the green data corresponding to the compensation area. The compensation degree B1 of the blue data corresponding to the compensation area may be greater than the compensation degree R1 of the red data corresponding to the compensation area. The red scale factor of the red data corresponding to the compensation area may be greater than the green scale factor of the green data corresponding to the compensation area. The blue scale factor of the blue data corresponding to the compensation area may be greater than the red scale factor of the red data corresponding to the compensation area.

In FIGS. 5 and 6, the compensation cycle may be four frames, and the number of the compensation operations may be two.

The scale factor for first color data RDO in the first pixel group (e.g., the odd-numbered pixel row) may be a first scale factor of one in an N-th frame FRAME N and in an N+1-th frame FRAME N+1, and may be a second scale factor that is less than one in an N+2-th frame FRAME N+2 and in an N+3-th frame FRAME N+3.

The scale factor for first color data RDE in the second pixel group (e.g., the even-numbered pixel row) may be the second scale factor in the N-th frame FRAME N and in the N+1-th frame FRAME N+1, and may be the first scale factor in the N+2-th frame FRAME N+2 and in the N+3-th frame FRAME N+3.

The scale factor for second color data GDO in the first pixel group (e.g., the odd-numbered pixel row) may be a first scale factor of one in the N-th frame FRAME N and in the N+1-th frame FRAME N+1, and may be a third scale factor that is less than one in the N+2-th frame FRAME N+2 and in the N+3-th frame FRAME N+3.

The scale factor for second color data GDE in the second pixel group (e.g., the even-numbered pixel row) may be the third scale factor in the N-th frame FRAME N and in the N+1-th frame FRAME N+1, and may be the first scale factor in the N+2-th frame FRAME N+2 and in the N+3-th frame FRAME N+3.

The scale factor for third color data BDO in the first pixel group (e.g., the odd-numbered pixel row) may be a first scale factor of one in the N-th frame FRAME N and in the N+1-th frame FRAME N+1, and may be a fourth scale factor that is less than one in the N+2-th frame FRAME N+2 and in the N+3-th frame FRAME N+3.

The scale factor for third color data BDE in the second pixel group (e.g., the even-numbered pixel row) may be the fourth scale factor in the N-th frame FRAME N and in the N+1-th frame FRAME N+1, and may be the first scale factor in the N+2-th frame FRAME N+2 and in the N+3-th frame FRAME N+3.

Figure 7:
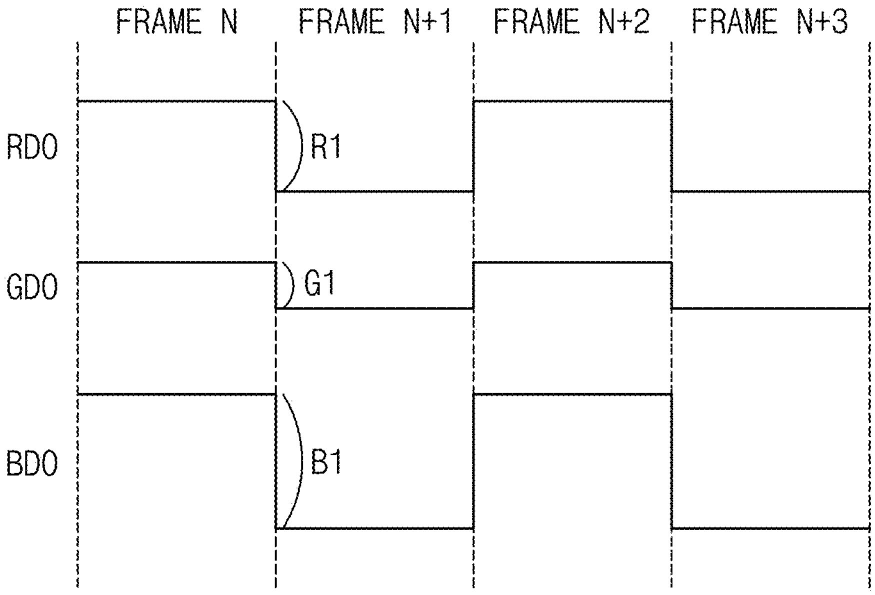
FIG. 7 is a timing diagram illustrating the compensation cycle and the compensation degree determined by the driving controller of FIG. 2 for the first pixel group.
Figure 8:
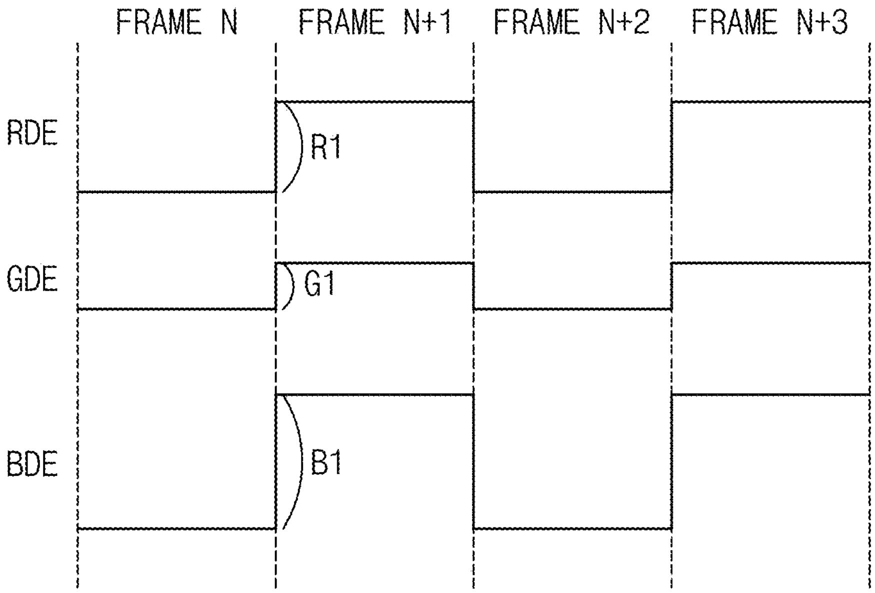
FIG. 8 is a timing diagram illustrating the compensation cycle and the compensation degree determined by the driving controller of FIG. 2 for the second pixel group.

FIG. 7 is a timing diagram illustrating the compensation cycle and the compensation degree determined by the driving controller 200 of FIG. 2 for the first pixel group. FIG. 8 is a timing diagram illustrating the compensation cycle and the compensation degree determined by the driving controller 200 of FIG. 2 for the second pixel group.

In FIGS. 7 and 8, the compensation cycle may be two frames, and the number of the compensation operations may be two.

The scale factor for first color data RDO in the first pixel group (e.g., the odd-numbered pixel row) may be a first scale factor of one in an N-th frame FRAME N and in an N+2-th frame FRAME N+2, and may be a second scale factor that is less than one in an N+1-th frame FRAME N+1 and in an N+3-th frame FRAME N+3.

The scale factor for first color data RDE in the second pixel group (e.g., the even-numbered pixel row) may be the second scale factor in the N-th frame FRAME N and in the N+2-th frame FRAME N+2, and may be the first scale factor in the N+1-th frame FRAME N+1 and in the N+3-th frame FRAME N+3.

The scale factor for second color data GDO in the first pixel group (e.g., the odd-numbered pixel row) may be a first scale factor of one in the N-th frame FRAME N and in the N+2-th frame FRAME N+2, and may be a third scale factor that is less than one in the N+1-th frame FRAME N+1 and in the N+3-th frame FRAME N+3.

The scale factor for second color data GDE in the second pixel group (e.g., the even-numbered pixel row) may be the third scale factor in the N-th frame FRAME N and in the N+2-th frame FRAME N+2, and may be the first scale factor in the N+1-th frame FRAME N+1 and in the N+3-th frame FRAME N+3.

The scale factor for third color data BDO in the first pixel group (e.g., the odd-numbered pixel row) may be a first scale factor of one in the N-th frame FRAME N and in the N+2-th frame FRAME N+2, and may be a fourth scale factor that is less than one in the N+1-th frame FRAME N+1 and in the N+3-th frame FRAME N+3.

The scale factor for third color data BDE in the second pixel group (e.g., the even-numbered pixel row) may be the fourth scale factor in the N-th frame FRAME N and in the N+2-th frame FRAME N+2, and may be the first scale factor in the N+1-th frame FRAME N+1 and in the N+3-th frame FRAME N+3.

Figure 9:
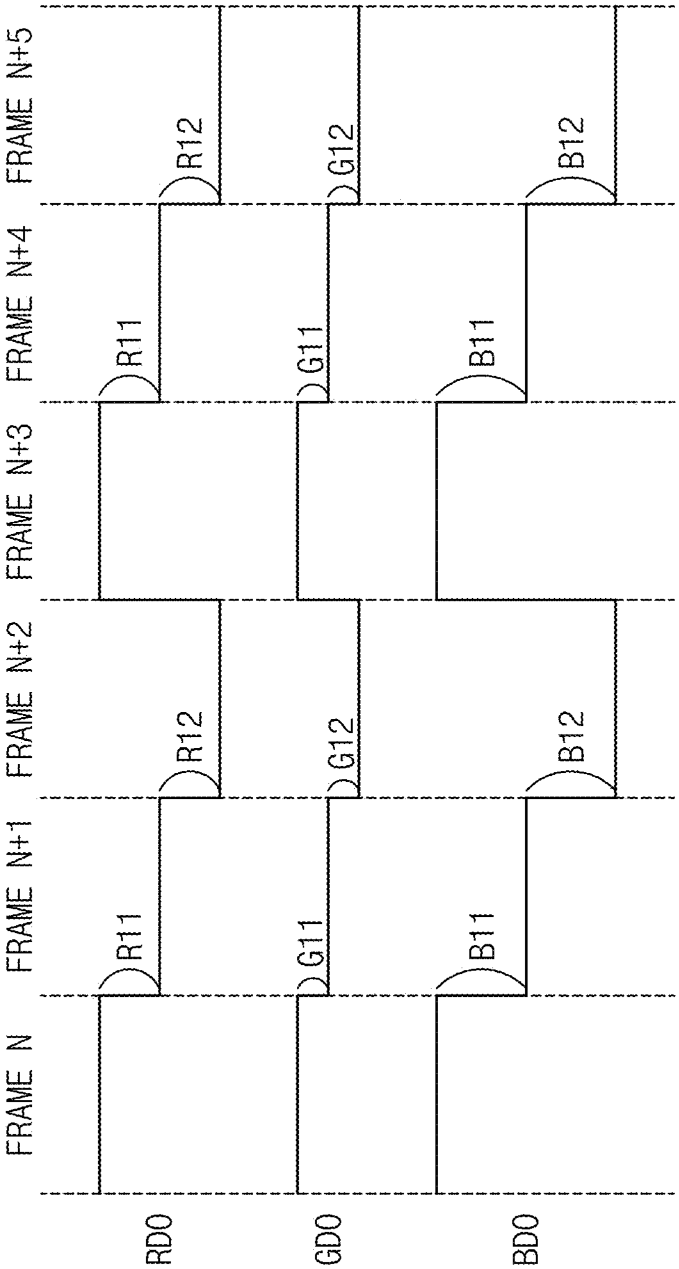
FIG. 9 is a timing diagram illustrating the compensation cycle and the compensation degree determined by the driving controller of FIG. 2 for the first pixel group.
Figure 10:
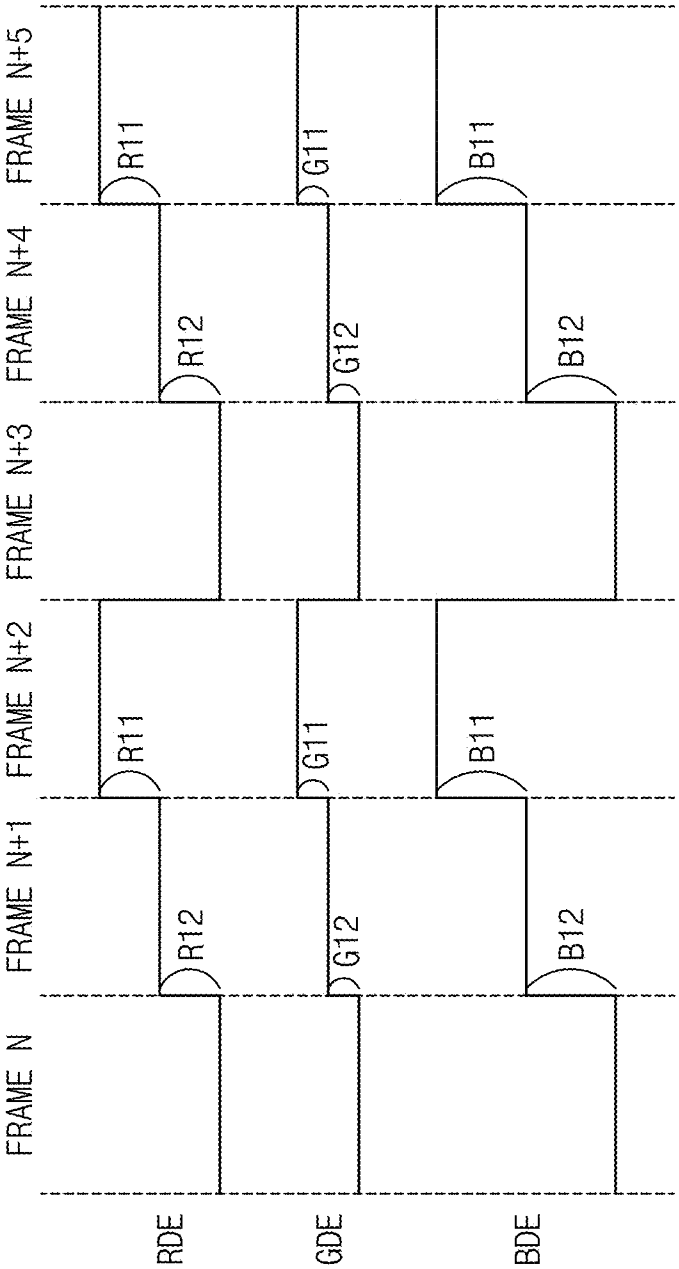
FIG. 10 is a timing diagram illustrating the compensation cycle and the compensation degree determined by the driving controller of FIG. 2 for the second pixel group.

FIG. 9 is a timing diagram illustrating the compensation cycle and the compensation degree determined by the driving controller of FIG. 2 for the first pixel group. FIG. 10 is a timing diagram illustrating the compensation cycle and the compensation degree determined by the driving controller of FIG. 2 for the second pixel group.

In FIGS. 9 and 10, the compensation cycle may be three frames, and the number of the compensation operations may be three.

The scale factor for first color data RDO in the first pixel group (e.g., the odd-numbered pixel row) may be a first scale factor of one in an N-th frame FRAME N and an N+3-th frame FRAME N+3, may be a second scale factor that is less than one in an N+1-th frame FRAME N+1 and in an N+4-th frame FRAME N+4, and may be a third scale factor that is less than the second scale factor in an N+2-th frame FRAME N+2 and an N+5-th frame FRAME N+5.

The scale factor for first color data RDE in the second pixel group (e.g., the even-numbered pixel row) may be the third scale factor in the N-th frame FRAME N and in the N+3-th frame FRAME N+3, may be the second scale factor in the N+1-th frame FRAME N+1 and in the N+4-th frame FRAME N+4, and may be the first scale factor in the N+2-th frame FRAME N+2 and the N+5-th frame FRAME N+5.

The scale factor for second color data GDO in the first pixel group (e.g., the odd-numbered pixel row) may be the first scale factor of one in the N-th frame FRAME N and in the N+3-th frame FRAME N+3, may be a fourth scale factor that is less than one in the N+1-th frame FRAME N+1 and in the N+4-th frame FRAME N+4, and may be a fifth scale factor that is less than the fourth scale factor in the N+2-th frame FRAME N+2 and the N+5-th frame FRAME N+5.

The scale factor for second color data GDE in the second pixel group (e.g., the even-numbered pixel row) may be the fifth scale factor in the N-th frame FRAME N and in the N+3-th frame FRAME N+3, may be the fourth scale factor in the N+1-th frame FRAME N+1 and in the N+4-th frame FRAME N+4, and may be the first scale factor in the N+2-th frame FRAME N+2 and the N+5-th frame FRAME N+5.

The scale factor for third color data BDO in the first pixel group (e.g., the odd-numbered pixel row) may be the first scale factor of one in the N-th frame FRAME N and in the N+3-th frame FRAME N+3, may be a sixth scale factor that is less than one in the N+1-th frame FRAME N+1 and in the N+4-th frame FRAME N+4, and may be a seventh scale factor that is less than the sixth scale factor in the N+2-th frame FRAME N+2 and the N+5-th frame FRAME N+5.

The scale factor for third color data BDE in the second pixel group (e.g., the even-numbered pixel row) may be the seventh scale factor in the N-th frame FRAME N and in the N+3-th frame FRAME N+3, may be the sixth scale factor in the N+1-th frame FRAME N+1 and in the N+4-th frame FRAME N+4, and may be the first scale factor in the N+2-th frame FRAME N+2 and the N+5-th frame FRAME N+5.

As shown in FIGS. 9 and 10, the compensation degree R11 and R12 of the first color data (e.g., the red data) may be different from the compensation degree G11 and G12 of the second color data (e.g., the green data). The compensation degree R11 and R12 of the first color data (e.g., the red data) may be greater than the compensation degree G11 and G12 of the second color data (e.g., the green data).

The compensation degree R11 and R12 of the first color data (e.g., the red data) may be different from the compensation degree B11 and B12 of the third color data (e.g., the blue data). The compensation degree R11 and R12 of the first color data (e.g., the red data) may be less than the compensation degree B11 and B12 of the third color data (e.g., the blue data).

Figure 11A:
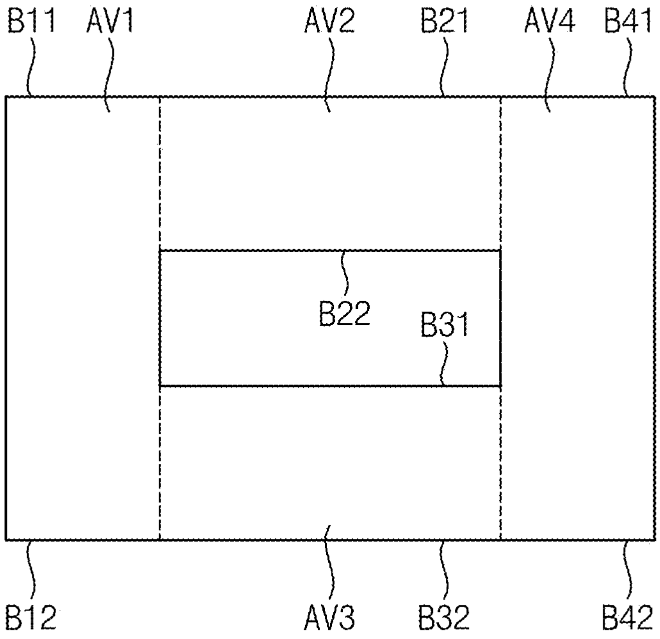
FIGS. 11A and 11B are diagrams illustrating a method of dividing the compensation target image of FIG. 4 in a vertical direction line and compensating the divided compensation target image.
Figure 11B:
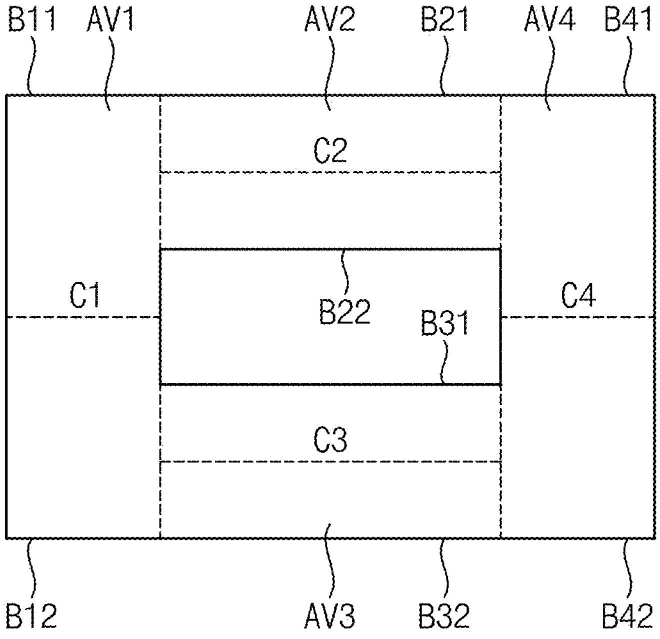
Figure 12:
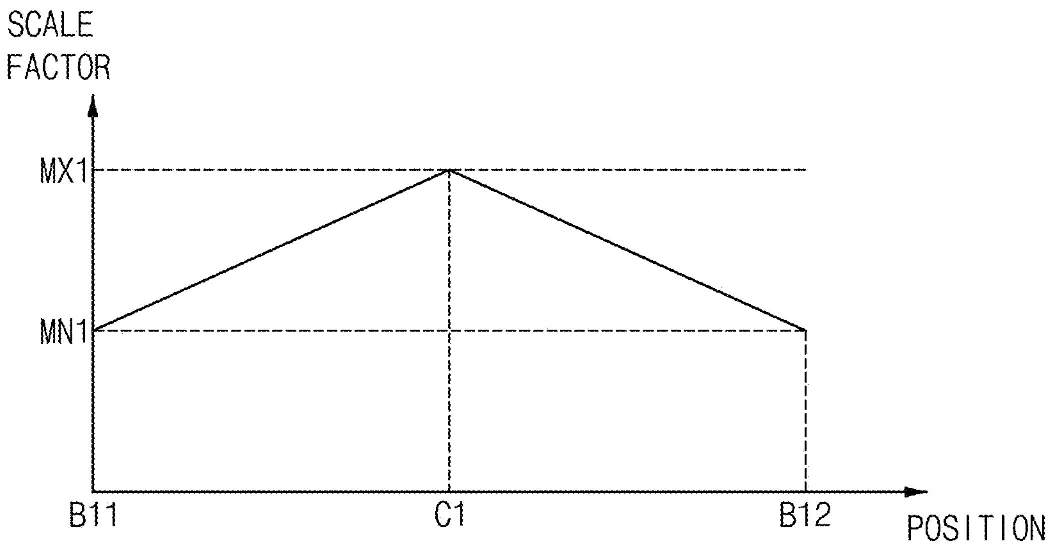
FIG. 12 is a graph illustrating a scale factor according to a vertical direction position of a first vertical division area of FIG. 11B.
Figure 13:
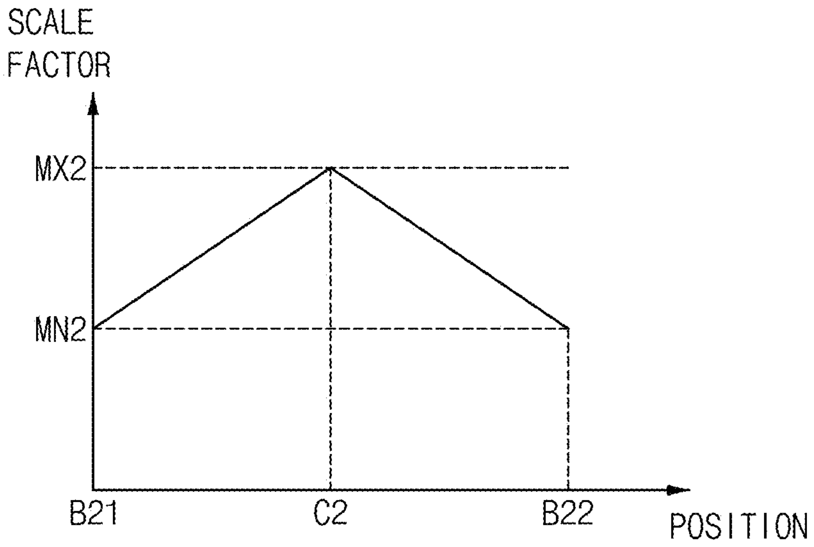
FIG. 13 is a graph illustrating a scale factor according to a vertical direction position of a second vertical division area of FIG. 11B.
Figure 14:
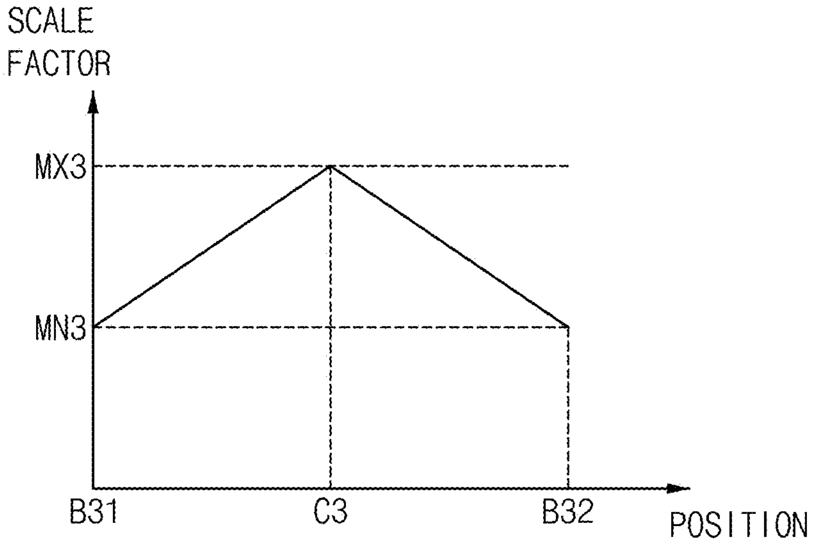
FIG. 14 is a graph illustrating a scale factor according to a vertical direction position of a third vertical division area of FIG. 11B.
Figure 15:
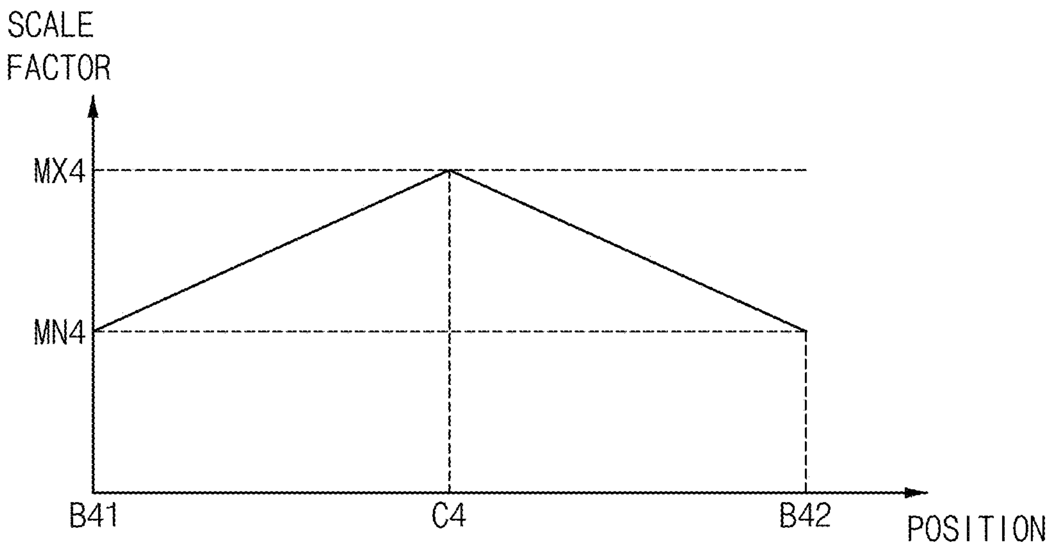
FIG. 15 is a graph illustrating a scale factor according to a vertical direction position of a fourth vertical division area of FIG. 11B.

FIGS. 11A and 11B are diagrams illustrating a method of dividing the compensation target image of FIG. 4 in a vertical direction line and compensating the divided compensation target image. FIG. 12 is a graph illustrating a scale factor according to a vertical direction position of a first vertical division area AV1 of FIG. 11B. FIG. 13 is a graph illustrating a scale factor according to a vertical direction position of a second vertical division area AV2 of FIG. 11B. FIG. 14 is a graph illustrating a scale factor according to a vertical direction position of a third vertical division area AV3 of FIG. 11B. FIG. 15 is a graph illustrating a scale factor according to a vertical direction position of a fourth vertical division area AV4 of FIG. 11B.

Referring to FIGS. 1 to 15, the compensation area between the first rectangle (A1 of FIG. 4) and the second rectangle (A2 of FIG. 4) may include the first vertical division area AV1, the second vertical division area AV2, the third vertical division area AV3, and the fourth vertical division area AV4.

The first vertical division area AV1 may be formed by a portion of a first horizontal side of the first rectangle (e.g., A1), a portion of a second horizontal side of the first rectangle, a first vertical side of the first rectangle, and an extended line of a first vertical side of the second rectangle (e.g., A2).

The second vertical division area AV2 may be formed by another portion of the first horizontal side of the first rectangle, a first horizontal side of the second rectangle, a portion of the extended line of the first vertical side of the second rectangle, and a portion of an extended line of a second vertical side of the second rectangle side.

The third vertical division area AV3 may be formed by a second horizontal side of the second rectangle, another portion of the second horizontal side of the first rectangle, another portion of the extended line of the first vertical side of the second rectangle, and another portion of the extended line of the second vertical side of the second rectangle side.

The fourth vertical division area AV4 may be formed by yet another portion of the first horizontal side of the first rectangle, yet another portion of the second horizontal side of the first rectangle, the extended line of the second vertical side of the second rectangle, and a second vertical side of the first rectangle.

The scale factors of the first vertical division area AV1, the second vertical division area AV2, the third vertical division area AV3, and the fourth vertical division area AV4 may be independently determined.

As shown in FIG. 12, the scale factor may decrease (from MX1 to MN1) from a vertical direction central portion C1 to vertical direction boundary portions B11 and B12 in the first vertical division area AV1.

As shown in FIG. 13, the scale factor may decrease (from MX2 to MN2) from a vertical direction central portion C2 to vertical direction boundary portions B21 and B22 in the second vertical division area AV2.

As shown in FIG. 14, the scale factor may decrease (from MX3 to MN3) from a vertical direction central portion C3 to vertical direction boundary portions B31 and B32 in the third vertical division area AV3.

As shown in FIG. 15, the scale factor may decrease (from MX4 to MN4) from a vertical direction central portion C4 to vertical direction boundary portions B41 and B42 in the fourth vertical division area AV4.

Figure 16A:
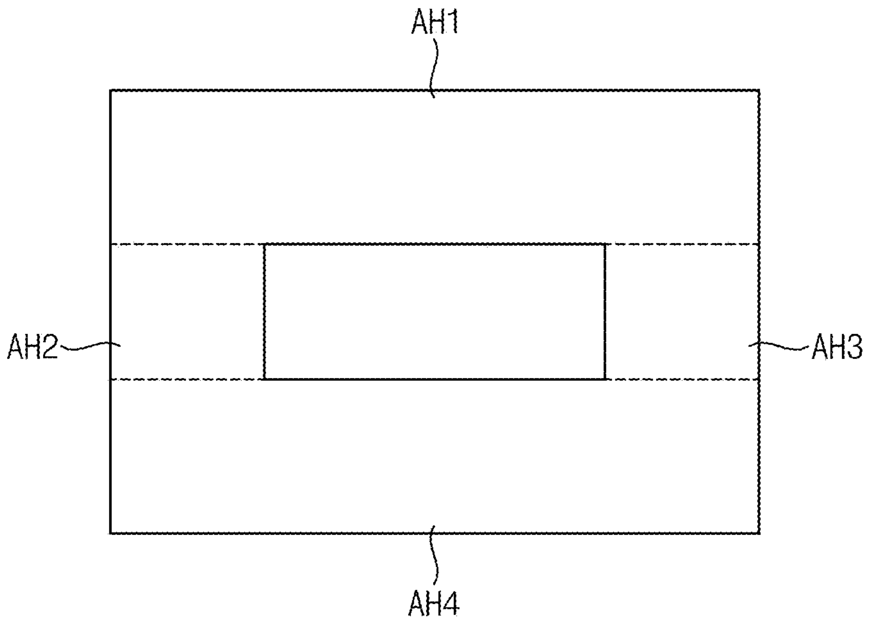
FIGS. 16A and 16B are diagrams illustrating a method of dividing the compensation target image of FIG. 4 in a horizontal direction line and compensating the divided compensation target image.
Figure 16B:
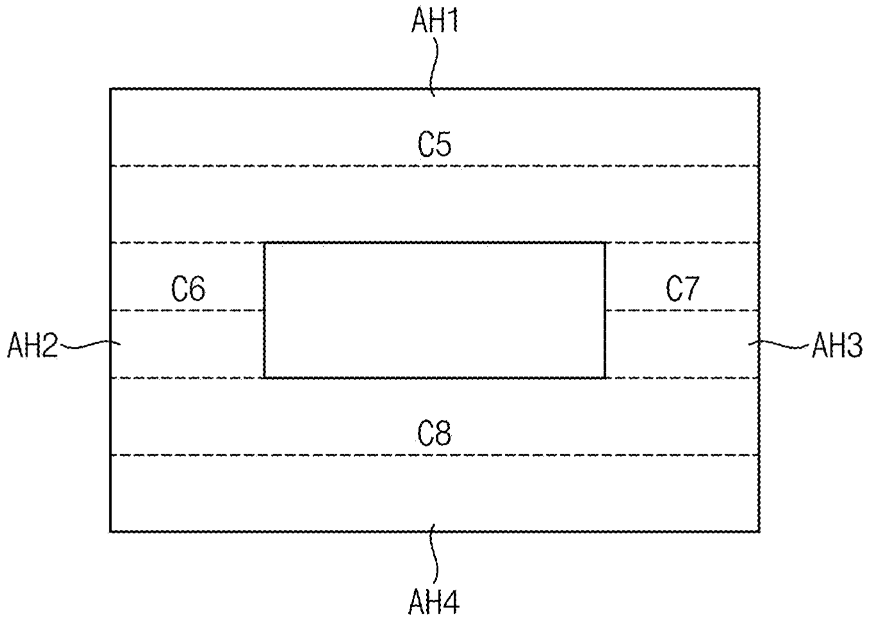

FIGS. 16A and 16B are diagrams illustrating a method of dividing the compensation target image of FIG. 4 in a horizontal direction line and compensating the divided compensation target image.

Referring to FIGS. 1 to 16B, the compensation area between the first rectangle (A1 of FIG. 4) and the second rectangle (A2 of FIG. 4) may include a first horizontal division area AH1, a second horizontal division area AH2, a third horizontal division area AH3, and a fourth horizontal division area AH4.

The first horizontal division area AH1 may be formed by a first horizontal side of the first rectangle, an extended line of a first horizontal side of the second rectangle, a portion of a first vertical side of the first rectangle, and a portion of a second vertical side of the first rectangle.

The second horizontal division area AH2 may be formed by a portion of the extended line of the first horizontal side of the second rectangle, a portion of an extended line of a second horizontal side of the second rectangle, a portion of the first vertical side of the first rectangle, and a first vertical side of the second rectangle.

The third horizontal division area AH3 may be formed by another portion of the extended line of the first horizontal side of the second rectangle, another portion of the extended line of the second horizontal side of the second rectangle, a second vertical side of the second rectangle, and another portion of the second vertical side of the first rectangle.

The fourth horizontal division area AH4 may be formed by the extended line of a second horizontal side of the second rectangle, a second horizontal side of the first rectangle, yet another portion of the first vertical side of the first rectangle, and yet another portion of the second vertical side of the first rectangle.

The scale factors of the first horizontal division area AH1, the second horizontal division area AH2, the third horizontal division area AH3, and the fourth horizontal division area AH4 may be independently determined.

The scale factor may decrease from a horizontal direction central portion C5 to horizontal direction boundary portions in the first horizontal division area AH1.

The scale factor may decrease from a horizontal direction central portion C6 to horizontal direction boundary portions in the second horizontal division area AH2.

The scale factor may decrease from a horizontal direction central portion C7 to horizontal direction boundary portions in the third horizontal division area AH3.

The scale factor may decrease from a horizontal direction central portion C8 to horizontal direction boundary portions in the fourth horizontal division area AH4.

A final scale factor of a position in the compensation area may be determined by multiplying a vertical scale factor of the vertical direction (explained referring to FIGS. 11A to 15) and a horizontal scale factor of the horizontal direction (explained referring to FIGS. 16A and 16B).

Alternatively, the compensation area may be compensated using only one of the vertical scale factor and the horizontal scale factor.

Figure 17:
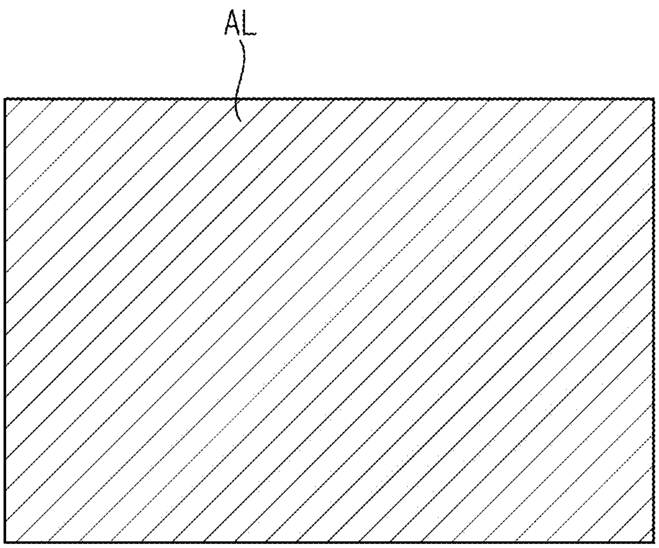
FIG. 17 is a diagram illustrating one or more embodiments of the compensation target image of a display panel of FIG. 1.
Figure 18:
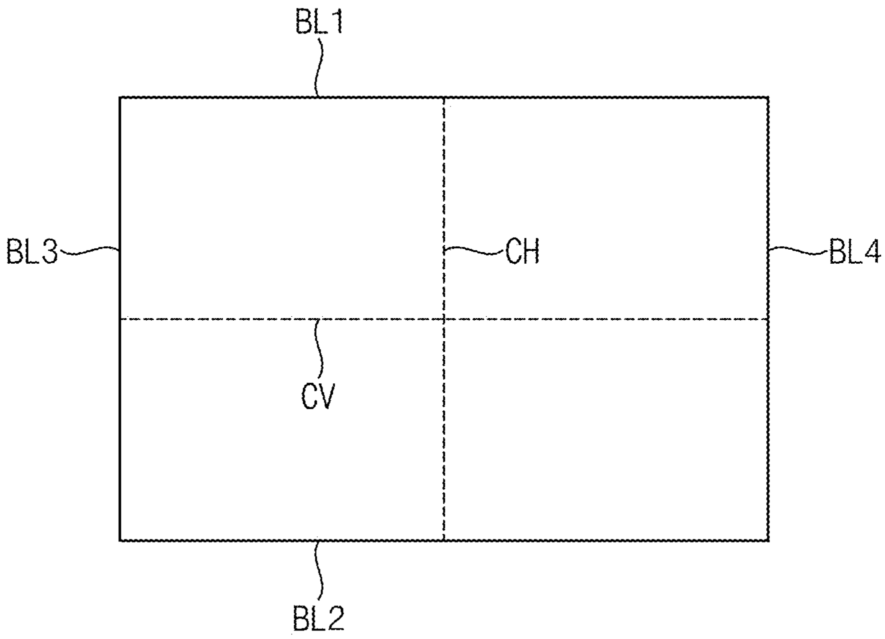
FIG. 18 is a diagram illustrating one or more embodiments of a method of compensating the compensation target image of FIG. 17.
Figure 19:
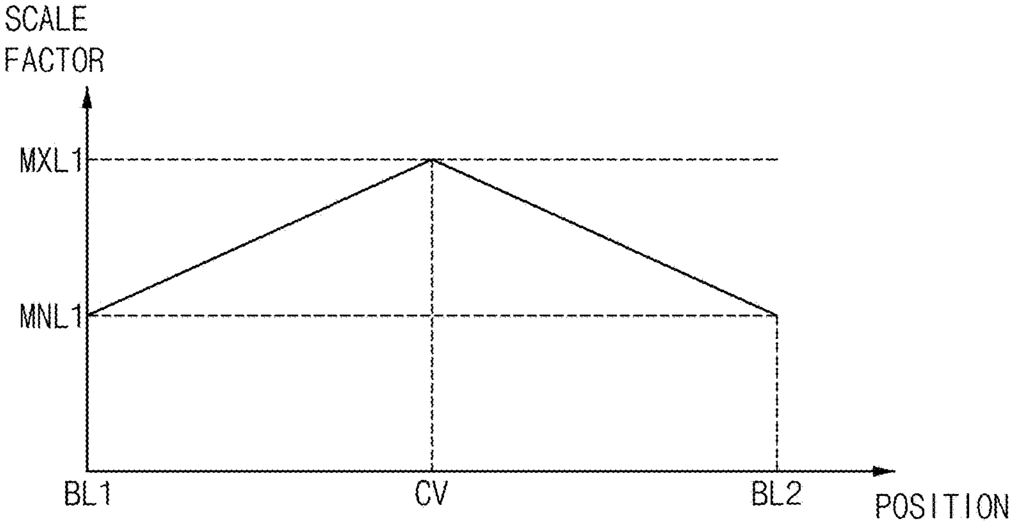
FIG. 19 is a graph illustrating a scale factor according to a vertical direction position of FIG. 18.
Figure 20:
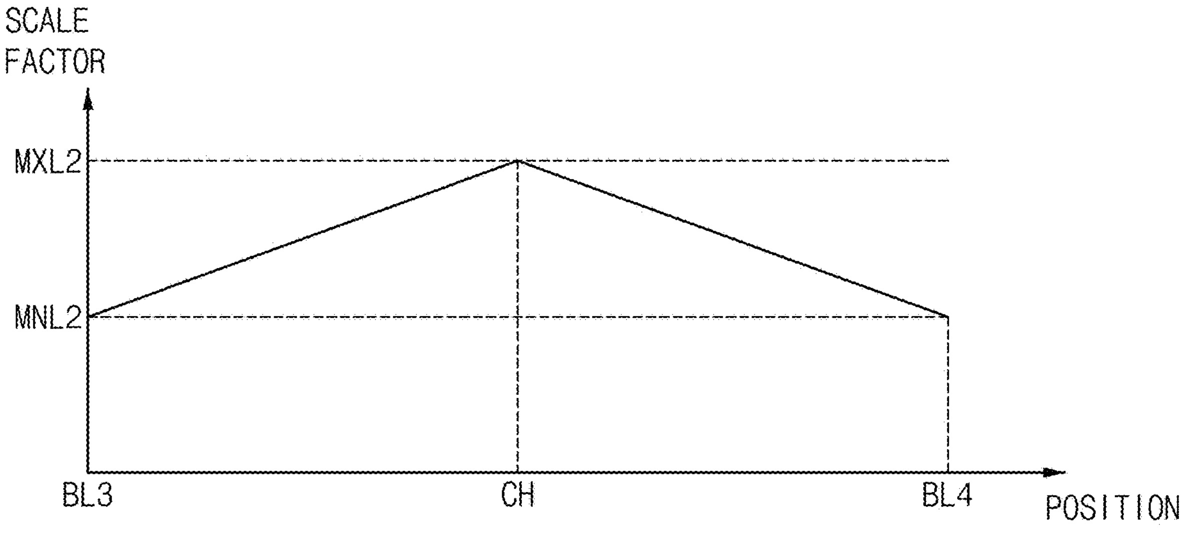
FIG. 20 is a graph illustrating a scale factor according to a horizontal direction position of FIG. 18.

FIG. 17 is a diagram illustrating one or more embodiments of the compensation target image of a display panel 100 of FIG. 1. FIG. 18 is a diagram illustrating one or more embodiments of a method of compensating the compensation target image of FIG. 17. FIG. 19 is a graph illustrating a scale factor according to a vertical direction position of FIG. 18. FIG. 20 is a graph illustrating a scale factor according to a horizontal direction position of FIG. 18.

Referring to FIGS. 1 to 20, the compensation target image may be a polygon representing a static pattern. For example, the static pattern may be a logo of a broadcasting company or a logo of a program. For example, the polygon representing the static pattern may be a rectangle.

A vertical scale factor may decrease (from MXL1 to MNL1) from a vertical direction central portion CV to vertical direction boundary portions BL1 and BL2 in the rectangle AL.

A horizontal scale factor may decrease (from MXL2 to MNL2) from a horizontal direction central portion CH to horizontal direction boundary portions BL3 and BL4 in the rectangle AL.

A final scale factor of a position in the compensation area may be determined by multiplying the vertical scale factor and the horizontal scale factor.

Alternatively, the compensation area may be compensated using only one of the vertical scale factor and the horizontal scale factor.

Figure 21:
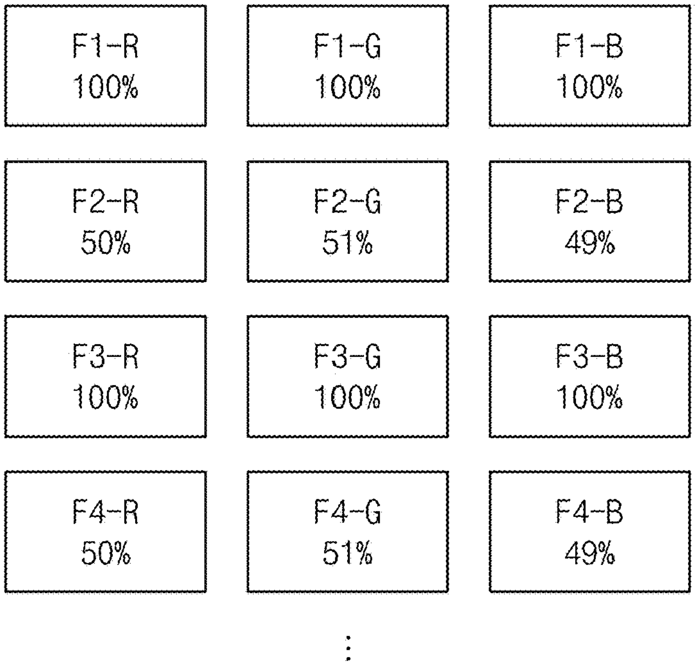
FIG. 21 is a diagram illustrating scale factors according to frames and colors in a first position of a compensation area determined by the driving controller of FIG. 2.
Figure 22:
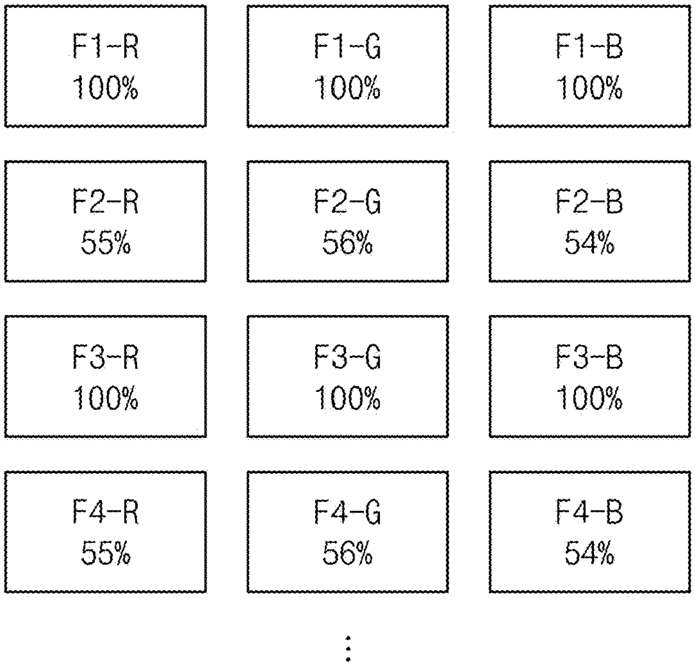
FIG. 22 is a diagram illustrating scale factors according to frames and colors in a second position of the compensation area determined by the driving controller of FIG. 2.

FIG. 21 is a diagram illustrating scale factors according to frames and colors in a first position of a compensation area determined by the driving controller 200 of FIG. 2. FIG. 22 is a diagram illustrating scale factors according to frames and colors in a second position of the compensation area determined by the driving controller 200 of FIG. 2.

Referring to FIGS. 1 to 22, the first position of FIG. 21 may mean the boundary portion of the compensation area, and the second position of FIG. 22 may mean a position spaced apart from the boundary portion of the compensation area by one pixel.

The compensation cycle may be two frames in FIGS. 21 and 22.

In FIG. 21, the scale factor (100%) of one may be applied to red data F1-R of a first frame, green data F1-G of the first frame, and blue data F1-B of the first frame.

In FIG. 21, the scale factor of 50% may be applied to red data F2-R of a second frame, the scale factor of 51% may be applied to green data F2-G of the second frame, and the scale factor of 49% may be applied to blue data F2-B of the second frame. Herein, the compensation degree of the red data may be greater than the compensation degree of the green data, and the compensation degree of the red data may be less than the compensation degree of the blue data.

In FIG. 21, the scale factor (100%) of one may be applied to red data F3-R of a third frame, green data F3-G of the third frame, and blue data F3-B of the third frame similarly to in the first frame.

In FIG. 21, the scale factor of 50% may be applied to red data F4-R of a fourth frame, the scale factor of 51% may be applied to green data F4-G of the fourth frame, and the scale factor of 49% may be applied to blue data F4-B of the fourth frame.

In FIG. 22, the scale factor (100%) of one may be applied to red data F1-R of a first frame, green data F1-G of the first frame, and blue data F1-B of the first frame.

In FIG. 22, the scale factor of 55% may be applied to red data F2-R of a second frame, the scale factor of 56% may be applied to green data F2-G of the second frame, and the scale factor of 54% may be applied to blue data F2-B of the second frame. Herein, the compensation degree of the red data may be greater than the compensation degree of the green data, and the compensation degree of the red data may be less than the compensation degree of the blue data.

In FIG. 22, the scale factor (100%) of one may be applied to red data F3-R of a third frame, green data F3-G of the third frame, and blue data F3-B of the third frame similarly to in the first frame.

In FIG. 22, the scale factor of 55% may be applied to red data F4-R of a fourth frame, the scale factor of 56% may be applied to green data F4-G of the fourth frame, and the scale factor of 54% may be applied to blue data F4-B of the fourth frame.

The compensation target image may be determined, the compensation area may be determined, the boundary portion of the compensation area may be relatively strongly compensated, and the central portion of the compensation area may be relatively weakly compensated, so that the afterimage of the boundary portion of the compensation target image may be effectively reduced or prevented.

Different compensation factors may be applied for the red data, the green data, and the blue data, different compensation factors may be applied to the odd-numbered pixel rows and the even-numbered pixel rows in according to frames, the compensation cycle of the compensation area and the number of the compensation operations of the compensation area may be determined so that the afterimage of the compensation target image may be effectively reduced or prevented.

The afterimage of the compensation target image may be reduced or prevented so that the display quality of the display panel 100 may be enhanced.

Figure 23:
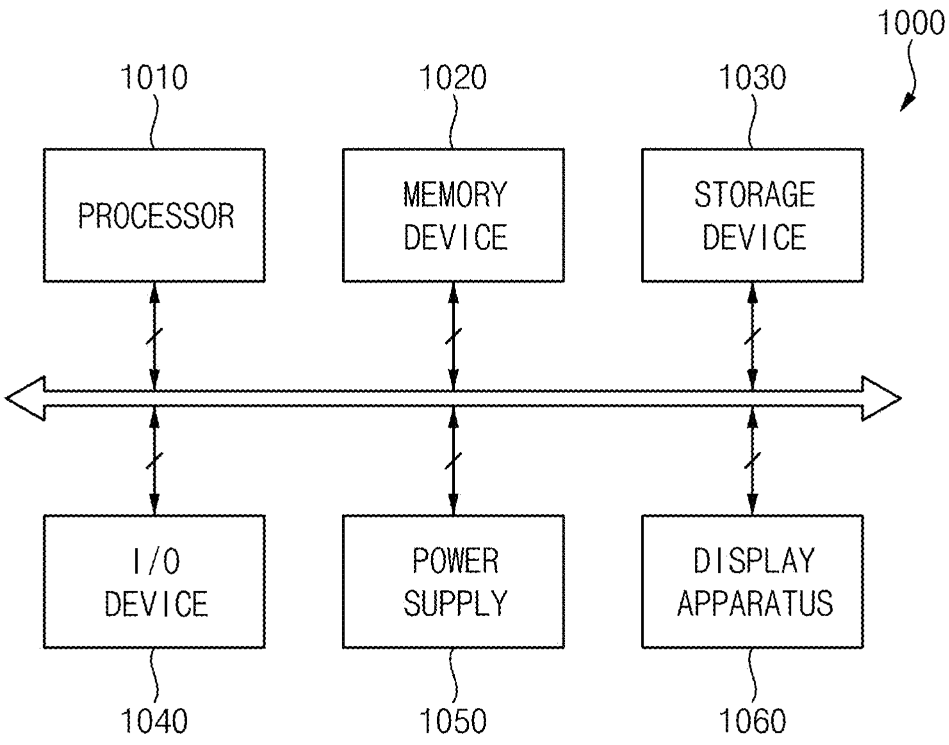
FIG. 23 is a block diagram illustrating an electronic apparatus according to one or more embodiments of the present disclosure.
Figure 24:
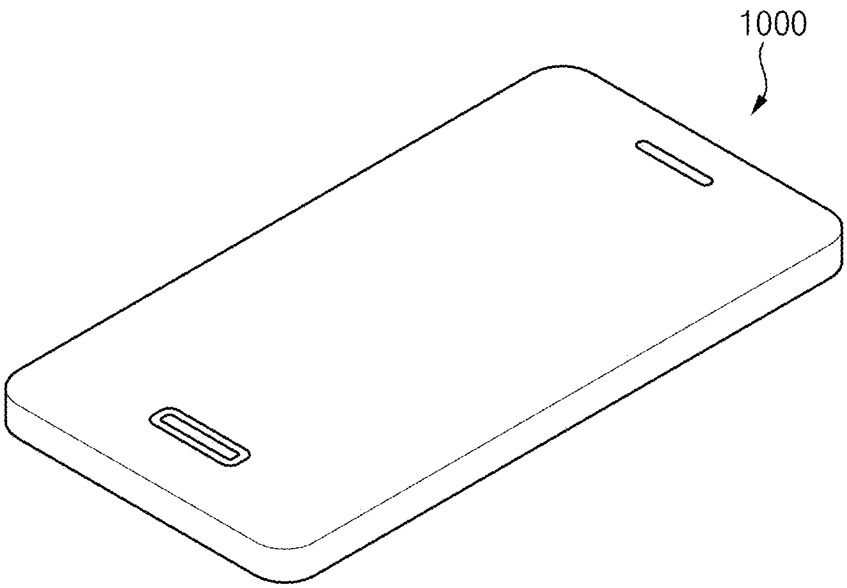
FIG. 24 is a diagram illustrating one or more embodiment in which the electronic apparatus of FIG. 23 is implemented as a smartphone.
Figure 25:
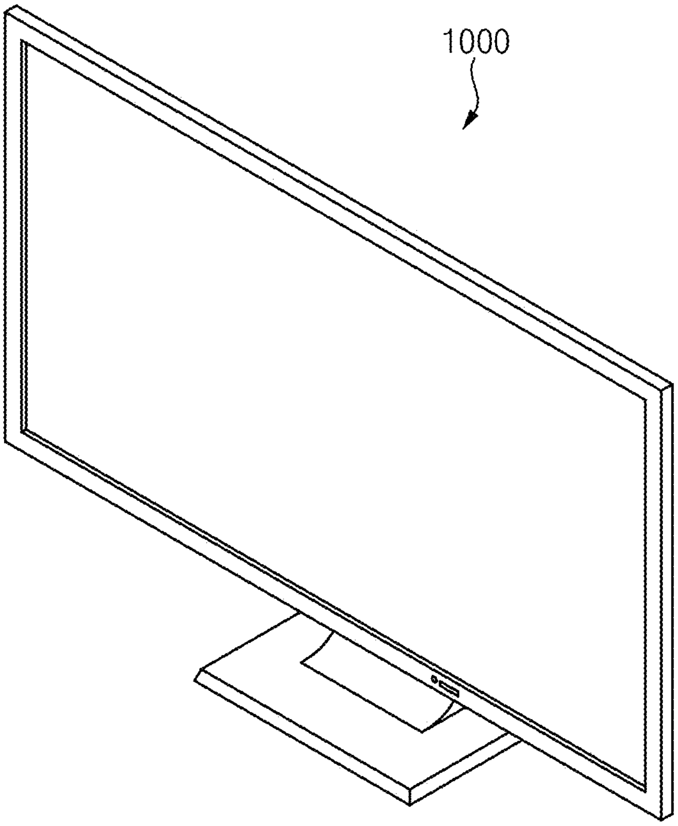
FIG. 25 is a diagram illustrating one or more embodiment in which the electronic apparatus of FIG. 23 is implemented as a monitor.

FIG. 23 is a block diagram illustrating an electronic apparatus 1000 according to one or more embodiments of the present disclosure. FIG. 24 is a diagram illustrating one or more embodiment in which the electronic apparatus 1000 of FIG. 23 is implemented as a smartphone. FIG. 25 is a diagram illustrating one or more embodiment in which the electronic apparatus 1000 of FIG. 23 is implemented as a monitor.

Referring to FIGS. 23 to 25, the electronic apparatus 1000 may include a processor 1010, a memory device 1020, a storage device 1030, an input/output (I/O) device 1040, a power supply 1050, and a display apparatus 1060. Here, the display apparatus 1060 may be the display apparatus of FIG. 1. In addition, the electronic apparatus 1000 may further include a plurality of ports for communicating with a video card, a sound card, a memory card, a universal serial bus (USB) device, other electronic apparatuses, etc.

In one or more embodiments, as illustrated in FIG. 24, the electronic apparatus 1000 may be implemented as a smartphone. In one or more embodiments, as illustrated in FIG. 25, the electronic apparatus 1000 may be implemented as a monitor. However, the electronic apparatus 1000 is not limited thereto. For example, the electronic apparatus 1000 may be implemented as a television, a cellular phone, a video phone, a smart pad, a smart watch, a tablet PC, a car navigation system, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus, such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device, such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device, such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device, such as a keyboard, a keypad, a mouse device, a touch-pad, a touch-screen, and the like and an output device, such as a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

The display apparatus 1060 according to one or more embodiments is a device that displays a moving image and/or a still image. The display apparatus 1060 may be applied to portable electronic devices such as mobile phones, smartphones, tablet personal computers (PCs), mobile communication terminals, electronic notebooks, electronic books, portable multimedia players (PMPs), navigations, and ultra-mobile PCs (UMPCs). For example, the display apparatus 1060 may be applied to a display unit of a television, a laptop computer, a monitor, a billboard, or the Internet of Things (IoT). Alternatively, in one or more embodiments, the display apparatus 1060 may be applied to a smartwatch, a watch phone, and/or a head-mounted display device (HMD) for implementing virtual reality and/or augmented reality.

According to the embodiments of the display apparatus and the method of driving the display panel using the display apparatus, the afterimage due to the deterioration may be reduced or prevented so that the display quality of the display panel may be enhanced.

The foregoing is illustrative of the present disclosure and is not to be construed as limiting thereof. Although a few embodiments of the present disclosure have been described, those skilled in the art will readily appreciate that many modifications are possible in the embodiments without materially departing from the aspects of the present disclosure. Accordingly, all such modifications are intended to be included within the scope of the present disclosure as defined in the claims, with functional equivalents thereof to be included therein. In the claims, means-plus-function clauses are intended to cover the structures described herein as performing the recited function and not only structural equivalents, but also equivalent structures. Therefore, it is to be understood that the foregoing is illustrative of the present disclosure and is not to be construed as limited to the specific embodiments disclosed, and that modifications to the disclosed embodiments, as well as other embodiments, are intended to be included within the scope of the appended claims. The present disclosure is defined by the following claims, with equivalents of the claims to be included therein.

What is claimed is:

1. A display apparatus comprising:

a display panel;

a data driver configured to output a data voltage to the display panel; and a driving controller configured to control the data driver, to determine a compensation target image, to determine a compensation area based on the compensation target image, to compensate input image data such that a compensation degree of a boundary portion of the compensation area is greater than a compensation degree of a central portion of the compensation area, to determine a first pixel group and a second pixel group, and to determine a compensation cycle and a number of compensation operations, wherein the compensation cycle is four frames, the number of the compensation operations is two, a scale factor for first color data in the first pixel group is a first scale factor of one in an N-th frame and an N+1-th frame, and is a second scale factor that is less than one in an N+2-th frame and an N+3-th frame, and a scale factor for first color data in the second pixel group is the second scale factor in the N-th frame and the N+1-th frame, and is the first scale factor in the N+2-th frame and the N+3-th frame, or wherein the compensation cycle is two frames, the number of the compensation operations is two, a scale factor for first color data in the first pixel group is a first scale factor of one in an N-th frame and an N+2-th frame, and is a second scale factor that is less than one in an N+1-th frame and an N+3-th frame, and a scale factor for first color data in the second pixel group is the second scale factor in the N-th frame and the N+2-th frame, and is the first scale factor in the N+1-th frame and the N+3-th frame, or wherein the compensation cycle is three frames, the number of the compensation operations is three, a scale factor for first color data in the first pixel group is a first scale factor of one in an N-th frame and an N+3-th frame, is a second scale factor that is less than one in an N+1-th frame and an N+4-th frame, and is a third scale factor that is less than the second scale factor in an N+2-th frame and an N+5-th frame, and a scale factor for first color data in the second pixel group is the third scale factor in the N-th frame and the N+3-th frame, is the second scale factor in the N+1-th frame and the N+4-th frame, and is the first scale factor in the N+2-th frame and the N+5-th frame.

2. The display apparatus of claim 1, wherein a scale factor of the boundary portion of the compensation area is less than a scale factor of the central portion of the compensation area.

3. The display apparatus of claim 1, wherein a red scale factor of red data corresponding to the compensation area, a green scale factor of green data corresponding to the compensation area, and a blue scale factor of blue data corresponding to the compensation area are different from one another.

4. The display apparatus of claim 3, wherein the red scale factor of the red data corresponding to the compensation area is less than the green scale factor of the green data corresponding to the compensation area, and wherein the blue scale factor of the blue data corresponding to the compensation area is less than the red scale factor of the red data corresponding to the compensation area.

5. The display apparatus of claim 1, wherein the compensation area is between a first rectangle, and a second rectangle in the first rectangle.

6. The display apparatus of claim 5, wherein the compensation area between the first rectangle and the second rectangle comprises:

a first vertical division area defined by a portion of a first horizontal side of the first rectangle, a portion of a second horizontal side of the first rectangle, a first vertical side of the first rectangle, and an extended line of a first vertical side of the second rectangle;

a second vertical division area defined by another portion of the first horizontal side of the first rectangle, a first horizontal side of the second rectangle, a portion of the extended line of the first vertical side of the second rectangle, and a portion of an extended line of a second vertical side of the second rectangle;

a third vertical division area defined by a second horizontal side of the second rectangle, another portion of the second horizontal side of the first rectangle, yet another portion of the extended line of the first vertical side of the second rectangle, and another portion of the extended line of the second vertical side of the second rectangle; and a fourth vertical division area defined by yet another portion of the first horizontal side of the first rectangle, yet another portion of the second horizontal side of the first rectangle, the extended line of the second vertical side of the second rectangle, and a second vertical side of the first rectangle, wherein the driving controller is configured to decrease a scale factor from a vertical direction central portion to vertical direction boundary portions in the first vertical division area, wherein the driving controller is configured to decrease a scale factor from a vertical direction central portion to vertical direction boundary portions in the second vertical division area, wherein the driving controller is configured to decrease a scale factor from a vertical direction central portion to vertical direction boundary portions in the third vertical division area, and wherein the driving controller is configured to decrease a scale factor from a vertical direction central portion to vertical direction boundary portions in the fourth vertical division area.

7. The display apparatus of claim 5, wherein the compensation area between the first rectangle and the second rectangle comprises:

a first horizontal division area defined by a first horizontal side of the first rectangle, an extended line of a first horizontal side of the second rectangle, a portion of a first vertical side of the first rectangle, and a portion of a second vertical side of the first rectangle;

a second horizontal division area defined by a portion of the extended line of the first horizontal side of the second rectangle, a portion of an extended line of a second horizontal side of the second rectangle, another portion of the first vertical side of the first rectangle, and a first vertical side of the second rectangle;

a third horizontal division area defined by another portion of the extended line of the first horizontal side of the second rectangle, another portion of the extended line of the second horizontal side of the second rectangle, a second vertical side of the second rectangle, and another portion of the second vertical side of the first rectangle; and a fourth horizontal division area defined by the extended line of the second horizontal side of the second rectangle, a second horizontal side of the first rectangle, yet another portion of the first vertical side of the first rectangle, and yet another portion of the second vertical side of the first rectangle, wherein the driving controller is configured to decrease a scale factor from a horizontal direction central portion to horizontal direction boundary portions in the first horizontal division area, wherein the driving controller is configured to decrease a scale factor from a horizontal direction central portion to horizontal direction boundary portions in the second horizontal division area, wherein the driving controller is configured to decrease a scale factor from a horizontal direction central portion to horizontal direction boundary portions in the third horizontal division area, and wherein the driving controller is configured to decrease a scale factor from a horizontal direction central portion to horizontal direction boundary portions in the fourth horizontal division area.

8. The display apparatus of claim 5, wherein the compensation area between the first rectangle and the second rectangle is divided into a plurality of vertical division area along an extended line of a first vertical side of the second rectangle, and an extended line of a second vertical side of the second rectangle, wherein the compensation area between the first rectangle and the second rectangle is divided into a plurality of horizontal division area along an extended line of a first horizontal side of the second rectangle, and an extended line of a second horizontal side of the second rectangle, wherein a vertical scale factor of a vertical direction is determined in the vertical division area, wherein a horizontal scale factor of a horizontal direction is determined in the horizontal division area, and wherein a final scale factor of a position in the compensation area is determined by multiplying the vertical scale factor and the horizontal scale factor.

9. The display apparatus of claim 1, wherein the compensation area is inside of a rectangle representing a static pattern, wherein a vertical scale factor decreases from a vertical direction central portion to vertical direction boundary portions in the rectangle, and wherein a horizontal scale factor decreases from a horizontal direction central portion to horizontal direction boundary portions in the rectangle.

10. The display apparatus of claim 9, wherein a final scale factor of a position in the compensation area is determined by multiplying the vertical scale factor and the horizontal scale factor.

11. The display apparatus of claim 1, wherein the driving controller comprises:

a compensation-area determiner configured to determine the compensation area corresponding to the compensation target image;

a compensation-cycle determiner configured to determine the compensation cycle;

a compensation-operation determiner configured to determine the number of the compensation operations; and a scale-factor determiner configured to determine a scale factor for decreasing a luminance of the compensation target image.

12. The display apparatus of claim 11, wherein the driving controller further comprises:

an image analyzer configured to determine an image pattern by analyzing the input image data; and an entry-condition determiner configured to determine whether the image pattern continues for a threshold time or longer.

13. The display apparatus of claim 12, wherein the compensation-area determiner, the compensation-cycle determiner, the compensation-operation determiner, and the scale-factor determiner are configured to operate in response to an enable signal of the entry-condition determiner.

14. A method of driving a display panel, the method comprising:

determining a compensation target image from input image data;

determining a compensation area based on the compensation target image;

compensating the input image data such that a compensation degree of a boundary portion of the compensation area is greater than a compensation degree of a central portion of the compensation area;

outputting a data voltage to the display panel based on the input image data which are compensated;

determining a first pixel group and a second pixel group in the compensation area; and determining a compensation cycle and a number of compensation operations, wherein the compensation cycle is four frames, the number of the compensation operations is two, a scale factor for first color data in the first pixel group is a first scale factor of one in an N-th frame and an N+1-th frame, and is a second scale factor that is less than one in an N+2-th frame and an N+3-th frame, and a scale factor for first color data in the second pixel group is the second scale factor in the N-th frame and the N+1-th frame, and is the first scale factor in the N+2-th frame and the N+3-th frame, or wherein the compensation cycle is two frames, the number of the compensation operations is two, a scale factor for first color data in the first pixel group is a first scale factor of one in an N-th frame and an N+2-th frame, and is a second scale factor that is less than one in an N+1-th frame and an N+3-th frame, and a scale factor for first color data in the second pixel group is the second scale factor in the N-th frame and the N+2-th frame, and is the first scale factor in the N+1-th frame and the N+3-th frame, or wherein the compensation cycle is three frames, the number of the compensation operations is three, a scale factor for first color data in the first pixel group is a first scale factor of one in an N-th frame and an N+3-th frame, is a second scale factor that is less than one in an N+1-th frame and an N+4-th frame, and is a third scale factor that is less than the second scale factor in an N+2-th frame and an N+5-th frame, and a scale factor for first color data in the second pixel group is the third scale factor in the N-th frame and the N+3-th frame, is the second scale factor in the N+1-th frame and the N+4-th frame, and is the first scale factor in the N+2-th frame and the N+5-th frame.

15. The method of claim 14, wherein a scale factor of the boundary portion of the compensation area is less than a scale factor of the central portion of the compensation area.

16. An electronic device comprising display apparatus comprising:

a display panel;

a data driver configured to output a data voltage to the display panel; and a driving controller configured to control the data driver, to determine a compensation target image, to determine a compensation area based on the compensation target image, to compensate input image data such that a compensation degree of a boundary portion of the compensation area is greater than a compensation degree of a central portion of the compensation area, to determine a first pixel group and a second pixel group, and to determine a compensation cycle and a number of compensation operations, wherein the compensation cycle is four frames, the number of the compensation operations is two, a scale factor for first color data in the first pixel group is a first scale factor of one in an N-th frame and an N+1-th frame, and is a second scale factor that is less than one in an N+2-th frame and an N+3-th frame, and a scale factor for first color data in the second pixel group is the second scale factor in the N-th frame and the N+1-th frame, and is the first scale factor in the N+2-th frame and the N+3-th frame, or wherein the compensation cycle is two frames, the number of the compensation operations is two, a scale factor for first color data in the first pixel group is a first scale factor of one in an N-th frame and an N+2-th frame, and is a second scale factor that is less than one in an N+1-th frame and an N+3-th frame, and a scale factor for first color data in the second pixel group is the second scale factor in the N-th frame and the N+2-th frame, and is the first scale factor in the N+1-th frame and the N+3-th frame, or wherein the compensation cycle is three frames, the number of the compensation operations is three, a scale factor for first color data in the first pixel group is a first scale factor of one in an N-th frame and an N+3-th frame, is a second scale factor that is less than one in an N+1-th frame and an N+4-th frame, and is a third scale factor that is less than the second scale factor in an N+2-th frame and an N+5-th frame, and a scale factor for first color data in the second pixel group is the third scale factor in the N-th frame and the N+3-th frame, is the second scale factor in the N+1-th frame and the N+4-th frame, and is the first scale factor in the N+2-th frame and the N+5-th frame.

17. The electronic device of claim 16, wherein the electronic device comprises a smartphone, a television, a monitor, a tablet, an electric vehicle, a mobile phone, a tablet personal computer (PC), a mobile communication terminal, an electronic notebook, an electronic book, a portable multimedia player (PMP), a navigation device, an ultra-mobile PC (UMPC), a laptop computer, a billboard, an Internet of Things (IoT) device, a smartwatch, a watch phone, or a head-mounted display (HMD).

* * * * *